US011875488B2

(12) United States Patent
Zhao et al.

(10) Patent No.: US 11,875,488 B2
(45) Date of Patent: Jan. 16, 2024

(54) METHOD AND DEVICE FOR PARALLEL PROCESSING OF RETINAL IMAGES

(71) Applicant: Henan University of Technology, Zhengzhou (CN)

(72) Inventors: Liang Zhao, Zhengzhou (CN); Chuan Zhou, Zhengzhou (CN); Xiaoxia Feng, Zhengzhou (CN); Jingjing Li, Zhengzhou (CN); Yuanyuan Liu, Zhengzhou (CN); Ranran Si, Zhengzhou (CN); Zhifeng Xie, Zhengzhou (CN); Yuankun Fu, Zhengzhou (CN); Junwei Jin, Zhengzhou (CN); Kunpeng Zhang, Zhengzhou (CN); Lei Zhang, Zhengzhou (CN); Shimeng Shi, Zhengzhou (CN); Tianci Wang, Zhengzhou (CN); Dongjiang Liu, Zhengzhou (CN); Meng Li, Zhengzhou (CN); Zhiyuan Shi, Zhengzhou (CN)

(73) Assignee: HENAN UNIVERSITY OF TECHNOLOGY, Zhengzhou (CN)

( * ) Notice: Subject to any disclaimer, the term of this patent is extended or adjusted under 35 U.S.C. 154(b) by 319 days.

(21) Appl. No.: 17/228,747

(22) Filed: Apr. 13, 2021

(65) Prior Publication Data

US 2022/0012859 A1 Jan. 13, 2022

(30) Foreign Application Priority Data

Jul. 9, 2020 (CN) .......................... 202010654695.0

(51) Int. Cl.
*G06T 5/00* (2006.01)
*G06T 5/50* (2006.01)
(Continued)

(52) U.S. Cl.
CPC ............... *G06T 5/50* (2013.01); *G06N 3/043* (2023.01); *G06N 3/045* (2023.01); *G06N 3/088* (2013.01);
(Continued)

(58) Field of Classification Search
CPC ...... G06N 3/045; G06N 3/043; G06N 3/0464; G06N 5/048; G06N 7/023; G06N 3/0455;
(Continued)

(56) References Cited

PUBLICATIONS

Matsopoulos et al, Automatic Retinal Image Registration Scheme Using Global Optimization Techniques, IEEE Trans. on Information technology in biomedicine, vol. 3, No. 1, pp. 47-60 (Year: 2019).*
(Continued)

*Primary Examiner* — Ping Y Hsieh
*Assistant Examiner* — Xiao Liu
(74) *Attorney, Agent, or Firm* — MATTHIAS SCHOLL P.C.; Matthias Scholl

(57) ABSTRACT

A method for parallel processing of retinal images includes: optimizing an objective function with a chaotic supply-demand algorithm to enhance a real retinal image; synthesizing a virtual retinal image by a hybrid image generation method; establishing a parallel multi-layer decomposed interval type-2 intuitionistic fuzzy convolutional neural network model based on the virtual retinal image and the enhanced real retinal image; and integrating outputs from a plurality of parallel multi-layer decomposed interval type-2 intuitionistic fuzzy convolutional neural network models as a final classification result.

4 Claims, 9 Drawing Sheets

(51) Int. Cl.
*G06N 3/088* (2023.01)
*G06T 3/60* (2006.01)
*G06N 3/043* (2023.01)
*G06N 3/045* (2023.01)

(52) U.S. Cl.
CPC ...... *G06T 3/60* (2013.01); *G06T 2207/20084* (2013.01); *G06T 2207/30041* (2013.01)

(58) Field of Classification Search
CPC ...... G06N 3/0475; G06N 3/096; G06N 7/046; G06F 18/214; G06F 30/27; G06T 2207/30041; G06T 3/0006; G06T 7/168; G06T 3/0056; G06V 10/82; G06V 40/18; G06V 20/20
See application file for complete search history.

(56) References Cited

PUBLICATIONS

Tripti Rani Borah et al, Retina Recognition System using Adaptive Neuro Fuzzy Inference System, IEEE International Conference on Computer, Communication and Control (IC4) (Year: 2015).*
Zhao et al, Supply-Demand-Based Optimization: A Novel Economics-Inspired Algorithm for Global Optimization, IEEE Access, vol. 9, pp. 73182-73206 (Year: 2019).*
Costa et al, End-to-End Adversarial Retinal Image Synthesis, IEEE Trans. om medical imaging, vol. 37, No. 3, pp. 781-791 (Year: 2018).*
Wang et al, Online Evolving Interval Type-2 Intuitionistic Fuzzy LSTM-Neural Networks for Regression Problems, IEEE Access, vol. 7, pp. 35544-35555 (Year: 2019).*

\* cited by examiner

METHOD AND DEVICE FOR PARALLEL PROCESSING OF RETINAL IMAGES

CROSS-REFERENCE TO RELAYED APPLICATIONS

Pursuant to 35 U.S.C. § 119 and the Paris Convention Treaty, this application claims foreign priority to Chinese Patent Application No. 202010654695.0 filed on Jul. 9, 2020, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the technical field of image processing and more particularly to a method and device for parallel processing of retinal images.

Conventionally, the processing of the objects in retinal images is mostly done by manual design. The method exhibits limitations in accuracy and objectivity. With the development of computer software and hardware technology and the maturity of computer vision technology, researchers are trying to find an efficient and intelligent way that can automatically process relevant features in retinal images without subjective reasoning, which provides more reliable and effective technical support for corresponding application fields such as biometric feature recognition. However, because it is difficult to obtain retinal image samples, let alone the diversity, it is necessary to specifically design deep learning models for problems in specific fields. All these lead to poor processing effect of retinal images and low generalization of models.

SUMMARY

The disclosure provides a method for parallel processing of retinal images, the method comprising:

S1: optimizing an objective function with a chaotic supply-demand algorithm to enhance a real retinal image;

S2: synthesizing a virtual retinal image by a hybrid image generation method;

S3: establishing a parallel multi-layer decomposed interval type-2 intuitionistic fuzzy convolutional neural network model based on the virtual retinal image and the enhanced real retinal image; and S4: integrating outputs from a plurality of parallel multi-layer decomposed interval type-2 intuitionistic fuzzy convolutional neural network models as a final classification result.

Further, S1 comprises:

S1.1: performing function transformation M on an input original real retinal image to obtain an enhanced output image, i.e.:

$$EI(i,j)=M(I(i,j)|\theta) \quad (1)$$

where $I(i, j)$ denotes a part of the input original real retinal image, and $EI(i, j)$ denotes a corresponding part of the enhanced retinal image, $i, j=1, 2, \ldots, n$; $\theta=(r, \beta, \rho, \sigma)$ is an undetermined parameter of the function (1); $M(I(i, j)|\theta)=M(I(i, j)|r, \beta, \rho, \sigma)=rP/(s(i, j)+\beta)(I(i, j)-\rho \times \overline{P}(i, j))+\overline{P}(i, j)^\sigma$ denotes an image enhancement function, $\overline{P}(i, j)=\Sigma_{p=1}^n \Sigma_{q=1}^n P(p, q)/n^2$ denotes the average of local pixels of the input original real retinal image, $s(i, j)=(\Sigma_{p=1}^n \Sigma_{q=1}^n (P(p, q)-\overline{P}(i, j))^2)^{1/2}/n$ denotes a mean square error of local pixels of the input original real retinal image, $P(p, q)$ denotes a pixel, n denotes the number of local pixels of the input original real retinal image, and $\overline{P}$ denotes a mean of all pixels;

S1.2: setting a respective objective function $J(\theta)$ according to the requirements of image enhancement, and obtaining parameter values when the objective function is optimized by the chaotic supply-demand algorithm, thus obtaining a reasonable image enhancement transformation function, and obtaining a satisfactory enhanced retinal image:

$$J(\theta)=npe(EI(\theta))\times \log(\log(EI(\theta)))\times entropy(EI(\theta)) \quad (2)$$

where $J(\theta)$ denotes the objective function, $npe(EI(\theta))$ denotes the number of pixels at the edge of the image, $\log(\log(EI(\theta)))$ denotes the Sobel operator for the density at the edge of the image, $entropy(EI(\theta))=-\Sigma_{t=1}^{256} p_t \log_2 p_t$, where $p_t$ denotes the probability of the tth brightness level of the enhanced image;

the chaotic supply-demand algorithm comprises:

S1.2.1: initializing market populations:

given the number of populations is $N_p$ and the dimensionality of a product price vector $p_i$ and of a production quantity vector $q_i$ is $\dim(\theta)=4$, determining a value range for $p_i$ and $q_i$ according to the search range for parameters in each dimension in a parameter vector $\theta=(r, \beta, \rho, \sigma)$, $p_{ij}=[\underline{p}_j, \overline{p}_j]$, $q_{ij}=[\underline{q}_j, \overline{q}_j]$;

selecting, for $p_{ij}$ and $q_{ij}$, uniformly distributed random numbers in a unit interval respectively to obtain an initial unit product price population $p_i(0)$ and quantity population $q_i(0)$;

iteratively calculating a two-dimensional Ikeda map by respectively using $p_{ij}(0)$ and $q_{ij}(0)$ as initial values, to obtain a candidate initial product price population $p_i$ and quantity population $q_i$ by chaos iteration, $1 \leq i \leq N_p N_T$, where $N_T$ denotes the number of iterations;

for $p_{ij}$ and $q_{ij}$ in each dimension, performing linear transformation to obtain a candidate initial product price $\tilde{p}_i$ and quantity $\tilde{q}_i$; and calculating, according to Formula (2), an objective function value $J(\tilde{p}_i)$ and $J(\tilde{q}_i)$ respectively for the price and quantity of each product in a population and then normalizing, respectively comparing the objective function values $J(\tilde{p}_i)$ and $J(\tilde{q}_i)$ with the uniformly distributed random numbers, and selecting $N_p$ product prices and quantities to form the initial production price population and quantity population;

S1.2.2: determining the value of parameters and calculating the initial optimal product:

comparing the objective function values of the price and quantity of a product in the initial population, and replacing $\tilde{p}_i$ with $\tilde{q}_i$ if $J(\tilde{p}_i)<J(\tilde{q}_i)$, where the product price with the greatest objective function value is $\tilde{p}_{best}=\text{argmax}_{1\leq i \leq N_p} J(\tilde{p}_i)$;

S1.2.3: performing the following iteration process when the number of iterations $t \leq Ter$, where Ter denotes the maximum number of iterations:

calculating the absolute variance of the objective function for the quantity of a product in a population, normalizing, and selecting the product quantity $\tilde{q}_k$ as the equilibrium point $\tilde{q}_e$ according to the roulette method; while for the determination of the equilibrium point for the price of a product, comprising two stages: in the first stage, at $t \leq Ter/2$, calculating the absolute variance of the objective function for the price of a product in a population, normalizing, and selecting the product price $\tilde{p}_l$ as the equilibrium point $\tilde{p}_e$ according to the roulette method, and in the second stage, at t>Ter/2, using the average of the product price in the population as the equilibrium point;

comparing the objective function values, replacing $\tilde{p}_i(t+1)$ with $\tilde{q}_i(t+1)$ if $J(\tilde{p}_i(t+1))<J(\tilde{q}_i)(t+1))$, $\tilde{p}_b(t+1)=\text{argmax}_{1\leq m\leq N_p} J(\tilde{p}_m(t+1))$, if $J(\tilde{p}_b(t+1))>J(\tilde{p}_{best})$, then $\tilde{p}_{best}=\tilde{p}_b(t+1)$, otherwise keeping $\tilde{p}_{best}$ unchanged; and disturbing by logistic chaotic mapping if $\tilde{p}_{best}$ remains unchanged after ten successive iterations and Ter has not yet been reached;

S1.2.4: at the end of iteration, outputting the optimal solution $\tilde{p}_{best}$, where the enhanced image $EI=M(I|\tilde{p}_{best})$ is the desired enhanced retinal image.

Further, S2 comprises:

S2.1: preliminarily generating a virtual retinal image from a collected real retinal image by geometric transformation:

inputting a real retinal image $RIm_i$, and applying a geometric transformation operator $T_g$ to the real image to obtain a virtual retinal image $SIm_j$, i=1, 2, ..., n, j=1, 2, ..., m:

$$SIM_j = T_g(RIm_i) \quad (7)$$

where $T_g$ is one of flip, clip, rotate, translate geometric transformation operators or a composition operator thereof;

S2.2: generating, according to the preliminarily generated virtual retinal image and the real retinal image, a new virtual retinal image by using a generative adversarial network, where a discriminator for the generative adversarial network consists of a decomposed fuzzy broad convolutional neural network and a generator for the generative adversarial network consists of a plurality of interval type-2 fuzzy convolutional neural networks and/or multi-layer interval type-2 fuzzy neural network;

training the generator by using different objective functions as training objectives to obtain a plurality of virtual retinal images, and selecting a finally generated virtual image from those virtual retinal images according to the following criterion:

$$\|\mu_r - \mu_g\|_p + tr(C_r + C_g - 2(C_r C_g)^{1/2}) \quad (11)$$

where $\mu_r$ and $\mu_g$, $C_r$ and $C_g$ denote, respectively, a sample mean vector and covariance matrix of the probability distribution $p_{data}$ of the input real retinal image samples and the probability distribution $p_g$ of the virtual retinal image samples synthesized by the generator; $\|\cdot\|_p$ denotes the p vector norm, and $tr(\cdot)$ denotes the trace of the matrix; and obtaining the selected virtual retinal image when Formula (11) is minimized in the generated virtual retinal image.

In a class of this embodiment, S3 comprises:

S3.1: establishing a parallel multi-layer decomposed interval type-2 intuitionistic fuzzy convolutional neural network; and S3.2: inputting the virtual retinal image and the enhanced real retinal image into the parallel multi-layer decomposed interval type-2 intuitionistic fuzzy convolutional neural network, performing feature extraction and feature sharing, performing convolution calculation based on the shared features to further extract relevant features, obtaining, based on the relevant features, a final output which is the class number or the probability of belonging to a certain class, and performing network calculation according to the above process to obtain the parallel multi-layer decomposed interval type-2 intuitionistic fuzzy convolutional neural network and then output.

In a class of this embodiment, S4 comprises:

S4.1: establishing a decider training dataset $\{S_e^k, Es_e^k\}_{k=1}^{N_e}$, where $S_e^k$ is the output vector from the individual deciders. $s_e^k = wr s r_e^k + wv s v_e^k$, wr and wv respectively denote weights for real and virtual ends, $sr_e^k$ and $sv_e^k$ respectively denote the class number or the probability of belonging to a certain class for the real and virtual ends of the individual decider, k=1, ..., $N_e$, $N_e$ denotes the number of samples in the decider training dataset, $S_e^k=(s_{1e}^k, ..., s_{De}^k)$, $s_{ie}^k$ denotes the output from the ith parallel multi-layer decomposed interval type-2 intuitionistic fuzzy convolutional neural network, i=1, ..., D, and $Es_e^k$ denotes the output label;

S4.2: training, by the established decider training dataset, an intuitionistic fuzzy decider based on hybrid parameter optimization:

$$Ys_e^k = \alpha \Sigma_{j=1}^M w_j \mathbb{T}_{i=1}^D \mu_{ij}(s_{ie}^k)/\Sigma_{j=1}^M \mathbb{T}_{i=1}^D \mu_{ij}(s_{ie}^k) + (1-\alpha)\Sigma_{j=1}^M v_j \mathbb{S}_{i=1}^D v_{ij}(s_{ie}^k)/\Sigma_{j=1}^M \mathbb{S}_{i=1}^D v_{ij}(s_{ie}^k) \quad (20)$$

where $\alpha \in (0,1)$, $Ys_e^k$ denotes the final output from the decider, and $s_{ie}^k$ denotes the output from the ith parallel multi-layer decomposed interval type-2 intuitionistic fuzzy convolutional neural network, i=1, ..., D; $w_j$ and $v_j$ denote the intuitionistic fuzzy rule consequents; $\mathbb{T}$ and $\mathbb{S}$ denote the triangular norm and triangular conorm; j=1, 2, ..., M, M denotes the number of fuzzy rules; $\mathbb{T}_{i=1}^D$ and $\mathbb{S}_{i=1}^D$ denote $\mathbb{T}$ and $\mathbb{S}$ operations from 1 to D;

adjusting the precondition parameters of the intuitionistic fuzzy decider by a batch gradient descent method, and estimating the consequent parameters of the intuitionistic fuzzy decider by a least square method, the whole process comprising:

S4.2.1: randomly initializing the center $c_{ij}$, the width $\sigma_{ij}$ and the scale coefficient $r_{ij}$ for the precondition membership function and non-membership function of the intuitionistic fuzzy decider, and adjusting the precondition parameters by the batch gradient descent method:

$$\nabla E(c_{ij}, \sigma_{ij}, r_{ij}, \alpha) = (\partial E/\partial c_{ij}, \partial E/\partial \sigma_{ij}, \partial E/\partial r_{ij}, \partial E/\partial \alpha) \quad (21)$$

where $\nabla E(c_{ij}, \sigma_{ij}, r_{ij}, \alpha)$ denotes the gradient vector, $E=\frac{1}{2}\Sigma_{k=1}^{N_b}(Ys_e^k - Es_e^k)^2$, which is the loss function, and $N_b$ denotes the number of data in each batch.

S4.2.2: calculating a firing strength for a fuzzy rule membership function and a fuzzy rule non-membership function by using the precondition parameters adjusted in the S4.2.1, i.e., $f_j(S_e^k)$ and $g_j(S_e^k)$, and normalizing to obtain $f'_j(S_e^k)=f_j(S_e^k)/\Sigma_{j=1}^M f_j(S_e^k)$ and $g'_j(S_e^k)=g_j(S_e^k)/\Sigma_{j=1}^M g_j(S_e^k)$; for a batch of data, obtaining matrices F' and G':

$$F' = \begin{bmatrix} f'_1(S_e^1) & \cdots & f'_M(S_e^1) \\ \vdots & \ddots & \vdots \\ f'_1(S_e^{N_b}) & \cdots & f'_M(S_e^{N_b}) \end{bmatrix}, \quad (22)$$

$$G' = \begin{bmatrix} g'_1(S_e^1) & \cdots & g'_M(S_e^1) \\ \vdots & \ddots & \vdots \\ g'_1(S_e^{N_b}) & \cdots & g'_M(S_e^{N_b}) \end{bmatrix}$$

according to Formula (22), obtaining a matrix synthesized by F' and G': $\Phi=[\alpha F'|(1-\alpha)G']$; for some consequent parameters of the fuzzy rule membership function $W=[w_1 ... w_M]^T$ and the other consequent parameters of the fuzzy rule non-membership function $V=[v_1 ... v_M]^T$, obtaining a parameter vector $\Theta=[W^T V^T]^T$, where $\Phi\Theta=ES_e$ according to Formula (20) because $\Phi$ is a $N_b \times 2M$ matrix and $ES_e$ is a $N_b \times 1$ output label vector, and obtaining a consequent parameter vector $\Theta=\Phi^+ES_e$ by generalized inverse.

The disclosure also provides a device for parallel processing of retinal images, the device comprising:

an image enhancement module configured to optimize an objective function with a chaotic supply-demand algorithm to enhance a real retinal image;

a virtual retinal image generation module configured to synthesize a virtual retinal image by a hybrid image generation method;

a model establishment module configured to establish a parallel multi-layer decomposed interval type-2 intuitionistic fuzzy convolutional neural network model based on the virtual retinal image and the enhanced real retinal image; and an ensemble module configured to integrate outputs from a plurality of parallel multi-layer decomposed interval type-2 intuitionistic fuzzy convolutional neural network models as a final classification result.

The following advantages are associated with the method and device for parallel processing of retinal images according embodiments of the disclosure:

1) The method overcomes the problem that the number and quality of retinal image training data samples cannot be guaranteed.

By a hybrid virtual retinal image generation method, the basic image synthesis method and the generative adversarial network are used together to generate a virtual image according to the real retinal fundus image. This guarantees the number and quality of training samples.

2) The method solves the influence on the performance of the data-driven classification model by the difference in distribution of the enhanced real retinal image samples and the virtual retinal image samples.

There is a difference in probability distribution of the virtual retinal image samples generated by the generative adversarial network and probability distribution of the enhanced real retinal image samples, which greatly influences the classification accuracy of the conventional image processing methods. The parallel multi-layer decomposed interval type-2 intuitionistic fuzzy convolutional neural network in the disclosure uses the virtual-real interactive feature sharing technology to realize the maximum coverage of feature elements in the feature space, with differentiated feature expressions embedded therein. This overcomes the negative impact on the modelling effect by the difference in distribution.

3) The use of the ensemble technology further improves the expressiveness of the retinal image features by the parallel multi-layer decomposed interval type-2 intuitionistic fuzzy convolutional neural network and the classification accuracy.

It is proposed in the disclosure that the intuitionistic fuzzy decider outputs the final classification result, the output from the individual parallel multi-layer decomposed interval type-2 intuitionistic fuzzy convolutional neural network is used as the input to the decider, the corresponding label is used as the label for the decider, and the decider parameters are adjusted by the hybrid parameter optimization method. The robustness of exact classification of retinal images is further improved.

DETAILED DESCRIPTION

To further illustrate, embodiments detailing a method and device for parallel processing of retinal images are described below. It should be noted that the following embodiments are intended to describe and not to limit the disclosure.

In the disclosure, first, an objective function (determined according to the specific requirements for image enhancement) is optimized with a chaotic supply-demand algorithm, to determine undetermined parameters for the transformation function so as to enhance the collected retinal image; then, in an appropriate order, conventional transformations (rotate, flip, increase contrast, translate, etc.) are performed on the enhanced retinal image, then the generative adversarial network and its variants are used to synthesize an image through adversarial training by using the previous retinal image as the real image, and the image is input, as the real image, to a joint training model formed by the generative model and the virtual-real interactive multi-layer decomposed interval type-2 intuitionistic fuzzy convolutional neural network to train the neural network while synthesizing the retinal image; and finally, the integrated multi-layer decomposed interval type-2 intuitionistic fuzzy convolutional neural network model is used for classification.

Figure 1:
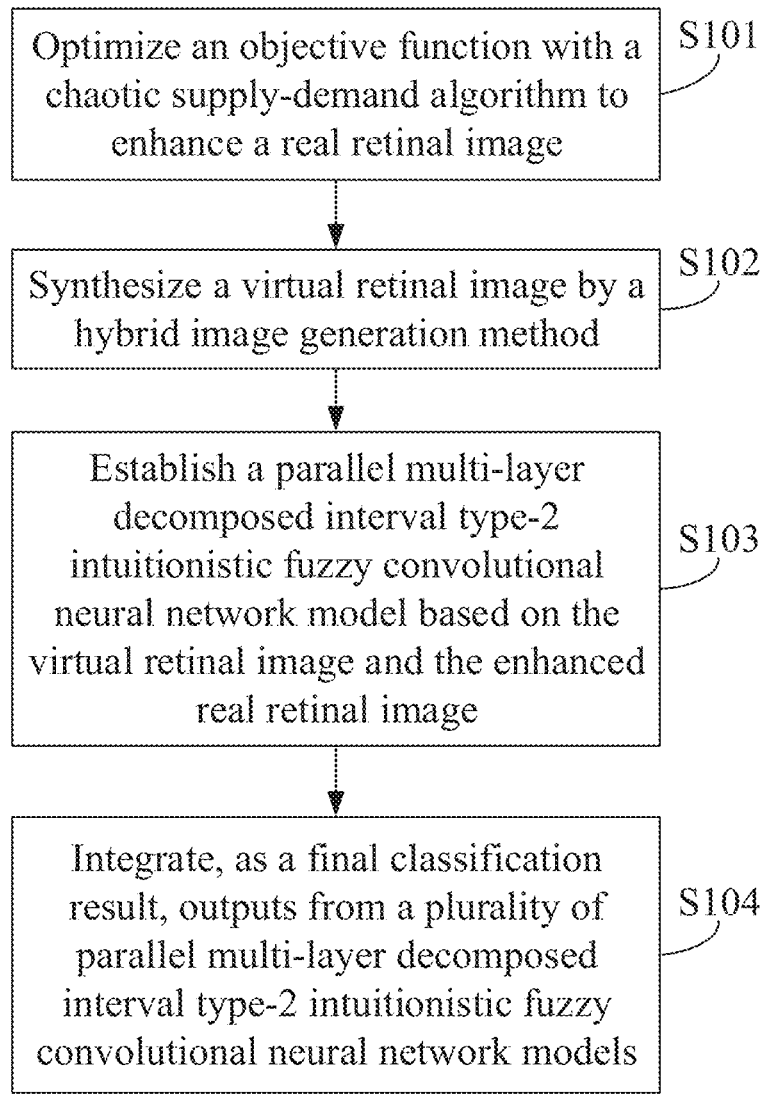
FIG. 1 is a basic flowchart of a method for parallel processing of retinal images according to an embodiment of the disclosure.

As shown in FIG. 1, a method for parallel processing of retinal images is provided, the method comprising:

S101: An objective function is optimized with a chaotic supply-demand algorithm to enhance a real retinal image.

It is unable to ensure that the quality of the retinal image can completely meet the requirements on classification, since the retinal imaging system is subjected to the device performance, the imaging environment and the related noise. Therefore, there is a need for studies on the retinal image enhancement. Essentially, image enhancement is to perform function transformation M on the input original real retinal image, to obtain an enhanced output image, i.e.:

$$EI(i,j)=M(I(i,j)|\theta) \quad (1)$$

where I(i, j) denotes a part of the input original real retinal image, and EI(i, j) denotes a corresponding part of the enhanced retinal image, i, j=1, 2, . . . , n; θ=(r, β, ρ, σ) is an undetermined parameter for the function; $M(I(i,j)|\theta)=M(I(i,j)|r, \beta, \rho, \sigma)=rP/(s(i,j)+\beta)(I(i,j)-\rho\times\overline{P}(i,j))+\overline{P}(i,j)^\sigma$ denotes an image enhancement function, $\overline{P}(i,j)=\Sigma_{p=1}^{n}\Sigma_{q=1}^{n}P(p,q)/n^2$ denotes the average of local pixels of the input original real retinal image, $s(i,j)=(\Sigma_{p=1}^{n}\Sigma_{q=1}^{n}(P(p,q)-\overline{P}(i,j))^2)^{1/2}/n$ denotes a mean square error of local pixels of the input original real retinal image, P(p, q) denotes a pixel, n denotes the number of local pixels of the input original real retinal image, and P denotes a mean of all pixels.

Therefore, a respective objective function J(θ) is set according to the requirements of image enhancement, and parameter values when the objective function is optimal are obtained by the chaotic supply-demand algorithm, thus obtaining a reasonable image enhancement transformation function, and obtaining a satisfactory enhanced retinal image. J(θ) is shown in Formula (1). An enhanced image is obtained from the original retinal image by the transformation function M(•|θ). The objective of image enhancement may be expressed by:

$$J(\theta)=npe(EI(\theta))\times\log(\log(EI(\theta)))\times entropy(EI(\theta)) \quad (2)$$

where J(θ) denotes the objective function, npe(EI(θ)) denotes the number of pixels at the edge of the image, log(log(EI(θ))) denotes the Sobel operator for the density at the edge of the image, $entropy(EI(\theta))=-\Sigma_{t=1}^{256}p_t \log_2 p_t$, where $p_t$ denotes the probability of the tth brightness level of the enhanced image.

Therefore, image enhancement becomes an optimization problem $\min_{\theta\in\Theta}J(\theta)$, that is, suitable parameter vectors are determined to optimize the objective function. The disclosure proposes a chaotic supply-demand algorithm to solve this problem. The chaotic supply-demand algorithm is a non-gradient optimization algorithm that utilizes the supply-demand relationship of commodities in the market-oriented economy to trigger the fluctuation of commodity prices, and finally achieves reasonable pricing (optimal parameter vector) through the interaction of commodity prices and quantities in the market. The whole algorithm comprises following calculation steps.

S101A: The market populations are initialized.

Given the number of populations is $N_p$ and the dimensionality of a product price vector $p_i$ and of a production quantity vector $q_i$ is dim(θ)=4, a value range for $p_i$ and $q_i$ is determined according to the search range for parameters in each dimension in a parameter vector θ=(r, β, ρ, σ), $p_{ij}=[\underline{p}_j, \overline{p}_j]$, $q_{ij}=[\underline{q}_j, \overline{q}_j]$.

For $p_{ij}$ and $q_{ij}$, uniformly distributed random numbers in a unit interval are selected respectively to obtain an initial unit product price population $p_i(0)$ and quantity population $q_i(0)$. Then, a two-dimensional Ikeda map is iteratively calculated by respectively using $p_{ij}(0)$ and $q_{ij}(0)$ as initial values:

$$p_{ij}(k+1)=1+\mu(p_{ij}(k)\cos(0.4-6/(1+p_{ij}(k)^2+q_{ij}(k)^2))-q_{ij}(k)\sin(0.4-6/(1+p_{ij}(k)^2+q_{ij}(k)^2))) \quad (3a)$$

$$q_{ij}(k+1)=\mu(p_{ij}(k)\sin(0.4-6/(1+p_{ij}(k)^2+q_{ij}(k)^2))+q_{ij}(k)\cos(0.4-6/(1+p_{ij}(k)^2+q_{ij}(k)^2))) \quad (3b)$$

where $\mu\in(0.6,\infty)$, k=0, 1, . . . , $N_T-1$; $N_T$ denotes the number of iterations. By chaotic iteration, a candidate initial product price population $p_i$ and quantity population $q_i$ may be obtained, $1\leq i\leq N_p N_T$.

Then, for $p_{ij}$ and $q_{ij}$ in each dimension, linear transformation is performed to obtain:

$$\tilde{p}_{ij}=(p_{ij}-p_j^{min})/(p_j^{max}-p_j^{min})(\overline{p}_j-\underline{p}_j)+\underline{p}_j \quad (4a)$$

$$\tilde{q}_{ij}=(q_{ij}-q_j^{min})/(q_j^{max}-q_j^{min})(\overline{q}_j-\underline{q}_j)+\underline{q}_j \quad (4b)$$

where $p_j^{min}$ and $p_j^{max}$ denote the minimum and maximum of the candidate initial product price, and $q_j^{min}$ and $q_j^{max}$ denote the minimum and maximum of the candidate initial product quantity. The candidate initial product price $\tilde{p}_i$ and quantity $\tilde{q}_i$ are obtained by such transformation.

The objective function values $J(\tilde{p}_i)$ and $J(\tilde{q}_i)$ are calculated, according to Formula (2), respectively for the price and quantity of each product in a population, then normalized $J'(\tilde{p}_i)=J(\tilde{p}_i)/\Sigma_{i=1}^{N_p N_T}J(\tilde{p}_i)$ and $J'(\tilde{q}_i)=J(\tilde{q}_i)/\Sigma_{i=1}^{N_p N_T}J(\tilde{q}_i)$, the objective function values $J(\tilde{p}_i)$ and $J(\tilde{q}_i)$ are respectively compared with the uniformly distributed random numbers, and $N_p$ product prices and quantities are selected to form the initial production price population and quantity population.

S101B: The value of parameters is determined and the initial optimal product is calculated.

The hyper-parameters u and v for the chaotic supply-demand algorithm are determined randomly. The objective function values of the price and quantity of a product in the initial population are compared, and $\tilde{p}_i$ is replaced with $\tilde{q}_i$ if $J(\tilde{p}_i)<J(\tilde{q}_i)$. The product price with the greatest objective function value is $\tilde{p}_{best}=\text{argmax}_{1\leq i\leq N_p}J(\tilde{p}_i)$.

S101C: The following iteration process is performed when the number of iterations t≤Ter, where Ter denotes the maximum number of iterations:

The absolute variance of the objective function for the quantity of a product in a population is calculated $A_{dev}(\tilde{q}_i)=|J(\tilde{q}_i)-\Sigma_{i=1}^{N_p}J(\tilde{q}_i)/N_p|$, normalized $A'_{dev}(\tilde{q}_i)=A_{dev}(\tilde{q}_i)/\Sigma_{i=1}^{N_p}A_{dev}(\tilde{q}_i)$, and the product quantity $\tilde{q}_k$ is selected as the equilibrium point $\tilde{q}_e$ according to the roulette method. For the determination of the equilibrium point for the price of a product, two stages are comprised: in the first stage, at t≤Ter/2, in order to improve the exploration ability of the optimization algorithm, the equilibrium point for the price of a product is determined in a similar method to the quantity of the product: first, the absolute variance of the objective function is calculated for the price of a product in a population $A_{dev}(\tilde{p}_i)=|J(\tilde{p}_i)-\Sigma_{i=1}^{N_p}J(\tilde{p}_i)/N_p|$, then normalized, and finally the product price $\tilde{p}_l$ is selected as the equilibrium point $\tilde{p}_e$ according to the roulette method; in the second stage, at t>Ter/2, in order to promote the exploitation ability of the algorithm, the average of the price of the product in the population is used directly as the equilibrium point $\tilde{p}_e=w\Sigma_{i=1}^{N_p}\tilde{p}_i/N_p$, where w is a uniformly distributed random number in a unit interval.

$$\tilde{q}_i(t+1)=u(\tilde{p}_i(t)-\tilde{p}_e)+\tilde{q}_e \quad (5a)$$

$$\tilde{p}_i(t+1)=v(\tilde{q}_i(t+1)-\tilde{q}_e)+\tilde{p}_e \quad (5b)$$

where u and v are random numbers, which are determined in the S101B. The objective function values are compared, $\tilde{p}_i(t+1)$ is replaced with $\tilde{q}_i(t+1)$ if $J(\tilde{p}_i(t+1))<J(\tilde{q}_i(t+1))$, $\tilde{p}_b(t+1)=\text{argmax}_{1\leq m\leq N_p}J(\tilde{p}_m(t+1))$, if $J(\tilde{p}_b(t+1))>J(\tilde{p}_{best})$, then $\tilde{p}_{best}=\tilde{p}_b(t+1)$, otherwise $\tilde{p}_{best}$ is kept unchanged. Disturbing is performed by logistic chaotic mapping if $\tilde{p}_{best}$ remains unchanged after ten successive iterations and Ter has not yet been reached. That is:

$$u(t+1)=\psi u(t)(1-u(t)) \quad (6a)$$

$$v(t+1)=\omega v(t)(1-v(t)) \quad (6b)$$

where ψ and ω are real numbers greater than 4, and ω≠ψ. Disturbing Formula (5) by chaotic parameters avoids the local optimal price and quantity of a product in a population. This improves the global search ability.

S101D: At the end of iteration, the optimal solution $\tilde{p}_{best}$ is output, where the enhanced image $EI=M(I|\tilde{p}_{best})$ is the desired enhanced retinal image.

S102: A virtual retinal image is synthesized by a hybrid image generation method.

Figure 2A:
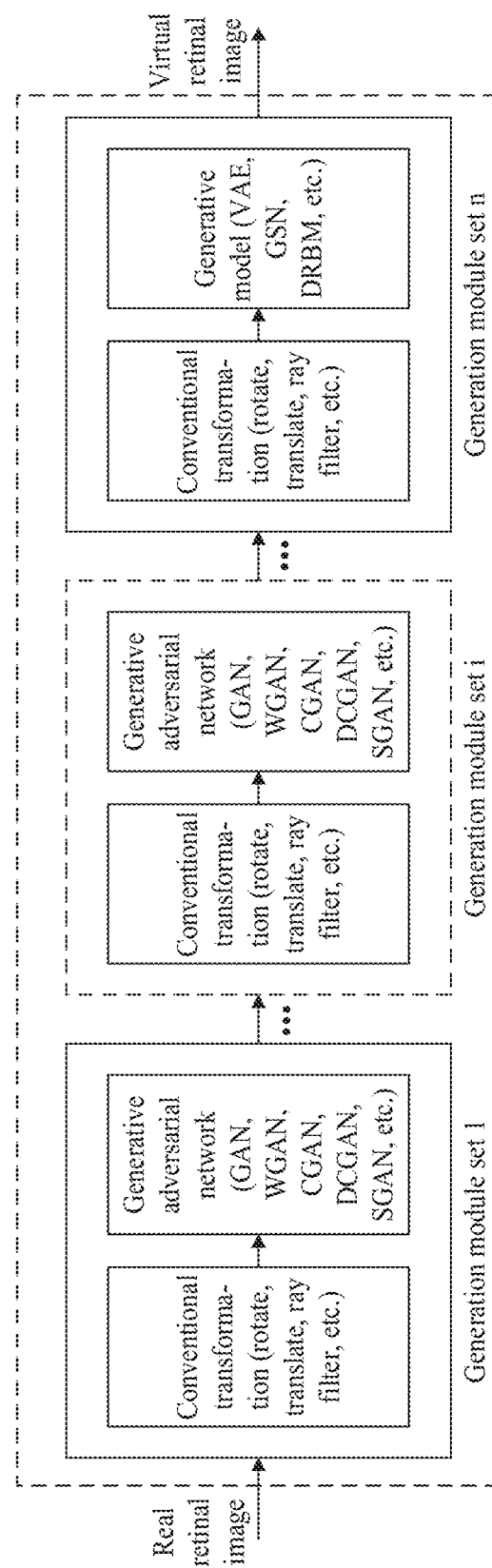
FIGS. 2A and 2B are each a flowchart of virtual retinal image synthesis in the method for parallel processing of retinal images according to an embodiment of the disclosure.
Figure 2B:
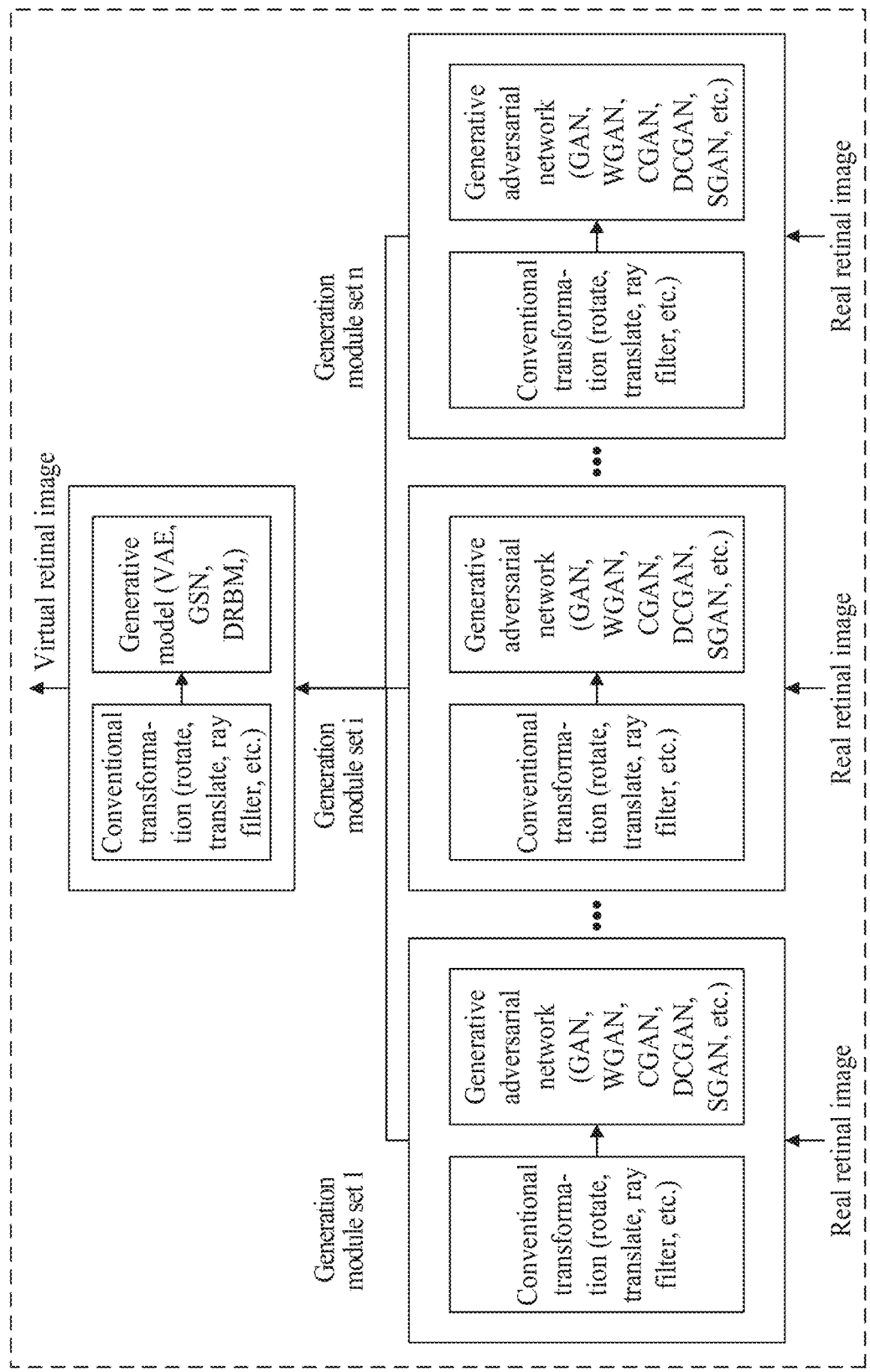

During the classification of retinal images, the acquisition and accurate labeling of high-quality retinal images requires a lot of manpower and material resources, so it is difficult to obtain a large number of labeled samples. This will greatly affect the training of the model, and thus cannot effectively exhibit the high-precision classification performance of the model. The deep generative model is used to synthesize virtual retinal images, and the classification model is trained based on parallel learning and virtual-real interaction, which overcomes the difficulties in effectively collecting a large number of samples and labelling them. In order to effectively ensure the diversity of virtual retinal images, the disclosure proposes a hybrid image generation method to acquire virtual images, which uses traditional image synthesis methods (i.e., geometric transformations such as flip, clip, rotate, noise injection) together with deep learning synthesis methods (generative adversarial network, meta-learning, etc.) to obtain high-quality virtual retinal fundus images, as shown in FIGS. 2A and 2B. The whole process comprises following steps.

S102A: A virtual retinal image is preliminarily generated from an actually collected retinal image by geometric transformation.

A real retinal image $RIm_i$ is input and a geometric transformation operator $T_g$ (flip $T_f$, clip $T_c$, rotate $T_r$, translate $T_t$, etc.) is applied to the real image to obtain a virtual retinal image $SIm_j$, i=1, 2, ..., n, j=1, 2, ..., m.

$$SIm_j = T_g(RIm_i) \quad (7)$$

where $T_g$ may be one of those transformation operators or a composition operator thereof.

S102B: A new virtual retinal image is generated, according to the preliminarily generated virtual retinal image and the real retinal image, by using a generative adversarial network and its variants.

Figure 3:
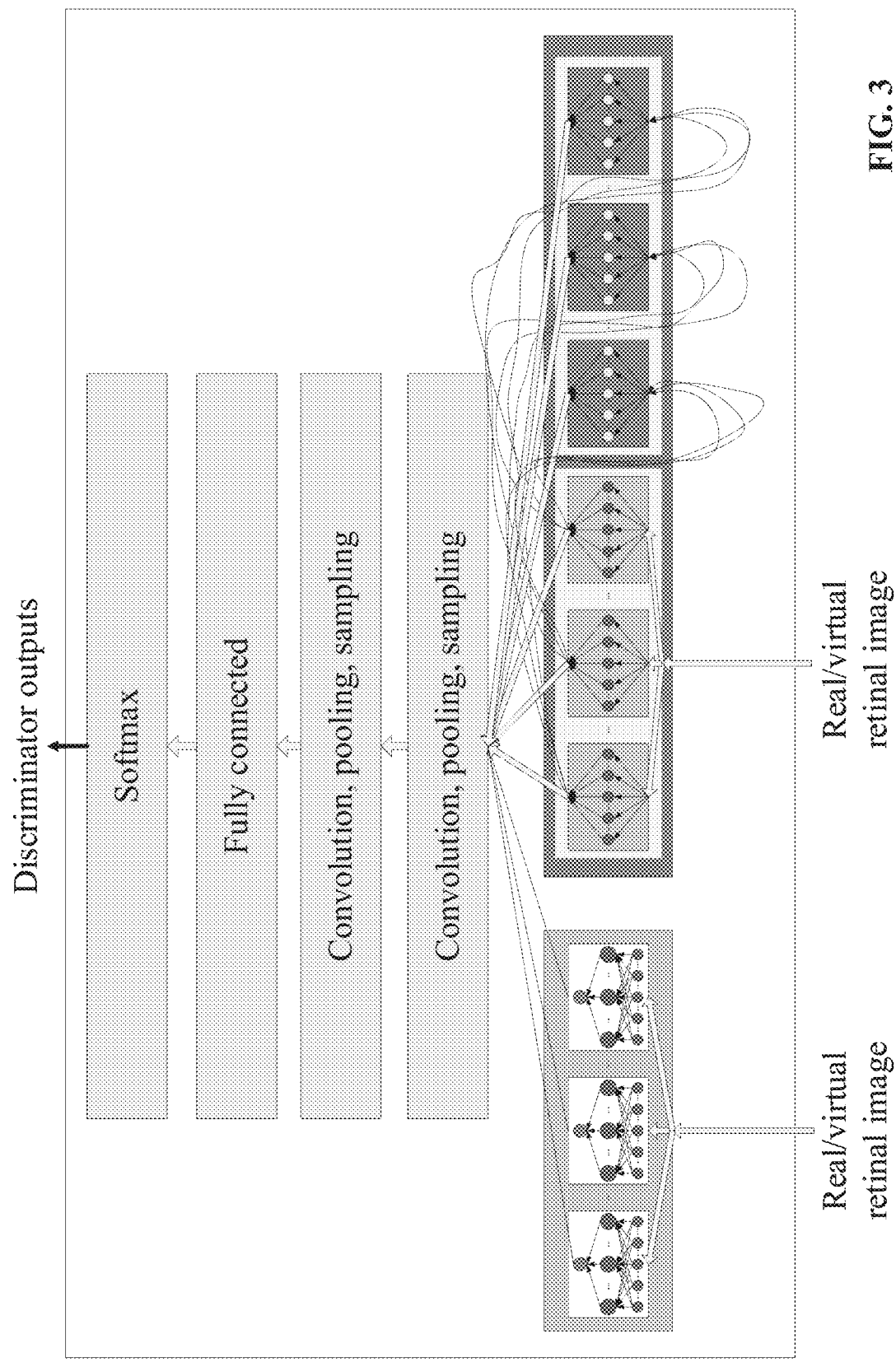
FIG. 3 is a structure diagram of a discriminator for the generative adversarial network in the method for parallel processing of retinal images according to an embodiment of the disclosure.

The real retinal image Rim and the preliminarily generated virtual retinal image Sim are used as the input retinal image $Im_{in}$={Rim, Sim}. For any noise image $Im_{ns}$, it is input to the generative adversarial network and its variants to generate a new virtual retinal image $Sim_n$ by adversarial games. Wherein a discriminator for the generative adversarial network consists of a decomposed fuzzy broad convolutional neural network and a generator for the generative adversarial network consists of a plurality of interval type-2 fuzzy convolutional neural networks and/or multi-layer interval type-2 fuzzy neural network (convolutional residual network). The structure of the discriminator for the generative adversarial network is shown in FIG. 3.

The first layer of the discriminator is the feature extraction layer (initial layer). In order to effectively suppress the random noise in the retinal image, a decomposed intuitionistic fuzzy reasoning system is used, and a structure with increased neurons in a single layer is used to increase the diversity of image extraction features. The input image is $Im_{in}$, and the membership function $\mu_{ij}(x_i)=\exp(-(x_i-c_{ij})^2/\sigma_{ij}^2)$ and the non-membership function $v_{ij}(x_i)=1-\alpha_{ij}\exp(-(x_i-c_{ij})^2/\sigma_{ij}^2)$ of intuitionistic fuzzy sets of the intuitionistic fuzzy reasoning rule precondition are decomposed into three membership and non-membership functions of the intuitionistic fuzzy sets, respectively, where $\alpha_{ij} \in (0,1)$, $c_{ij} \in R$, $\sigma_{ij} \in R^+$, i.e.:

$$\mu_{ij}^l(x_i) = \begin{cases} 1-\exp(-(x_i-c_{ij})^2/\sigma_{ij}^2), & x_i < c_{ij} \\ 0, & x_i \geq c_{ij} \end{cases} \quad (8a)$$

$$v_{ij}^l(x_i) = \begin{cases} a_{ij}\exp(-(x_i-c_{ij})^2/\sigma_{ij}^2), & x_i < c_{ij} \\ a_{ij}, & x_i \geq c_{ij} \end{cases} \quad (8b)$$

$$\mu_{ij}^c(x_i) = \exp(-(x_i-c_{ij})^2/\sigma_{ij}^2) \quad (8c)$$

$$v_{ij}^c(x_i) = 1 - a_{ij}\exp(-(x_i-c_{ij})^2/\sigma_{ij}^2) \quad (8d)$$

$$\mu_{ij}^r(x_i) = \begin{cases} 0, & x_i < c_{ij} \\ 1-\exp(-(x_i-c_{ij})^2/\sigma_{ij}^2), & x_i \geq c_{ij} \end{cases} \quad (8e)$$

$$v_{ij}^r(x_i) = \begin{cases} a_{ij}, & x_i < c_{ij} \\ a_{ij}\exp(-(x_i-c_{ij})^2/\sigma_{ij}^2), & x_i \geq c_{ij} \end{cases} \quad (8f)$$

The intuitionistic fuzzy reasoning comprises a membership part and a non-membership part. The firing strength for the intuitionistic fuzzy rule is calculated, respectively, according to Formulas (8a)-(8f): $f_j(X) = \mathbb{T}_{i=1}^{MN} \mu_{ij}^*(x_i)$ and $g_j(X) = \mathbb{S}_{i=1}^{MN} v_{ij}^*(x_i)$, where $\mathbb{T}$ and $\mathbb{S}$ denote the triangular norm and triangular conorm, * denotes l, c, r, i.e., the three decomposed membership and non-membership functions. The intuitionistic fuzzy rule consequents are $w_j$ and $v_j$, then the decomposed intuitionistic fuzzy reasoning sub-system outputs:

$$Out_r^{(1)}(X) = \alpha \Sigma_{j=1}^{M_r} w_j f_j(X)/\Sigma_{j=1}^{M_r} f_j(X) + \beta \Sigma_{j=1}^{M_r} v_j g_j(X)/\Sigma_{j=1}^{M_r} g_j(X) \quad (9)$$

where $Out_r^{(1)}(X)$ denotes the output from the first layer (the initial feature extraction layer), $\alpha, \beta \in (0,1)$, $\alpha+\beta=1$, $M_r$ denotes the number of rules in the rth decomposed intuitionistic fuzzy sub-system, r=1, 2, ..., R. In order to further enhance the diversity of extracted features, a feature extraction method with variable width is adopted. The retinal image $Im_{in}$ is input to the feature extraction module set $F_p$, p=1, 2, ..., P, and the activation function is $\varphi_p$, then the output feature from the extraction module is $Out_{p_g}^{(1)} = \varphi_{p_g}(W_{p_g}X + b_{p_g})$, where $W_{p_g}$ is a random weight and $b_{p_g}$ is a random bias. In order to improve the diversity of features, the previous output feature $Out_{p_g}^{(1)}$ is used as the input to the feature extraction module set $T_q$, q=1, 2, ..., Q for feature extraction again, i.e., $Out_{q_h}^{(1)} = \phi_{q_h}(W_{q_h}Out_p^{(1)} + b_{q_h})$ where $W_{q_h}, b_{q_h}$ are similar to $W_{p_g}, b_{p_g}$ respectively. According to the actual needs, the above process can continue, until a feature vector for the initial feature extraction layer is obtained $Out^{(1)} = (\ldots Out_r^{(1)} \ldots Out_{p_g}^{(1)} \ldots Out_{q_h}^{(1)})$. Then, it is used as the input to the convolutional layer for further feature extraction, and a probability is output through the fully connected layer and softmax, which indicates the degree of truth of the input retinal image.

Figure 4:
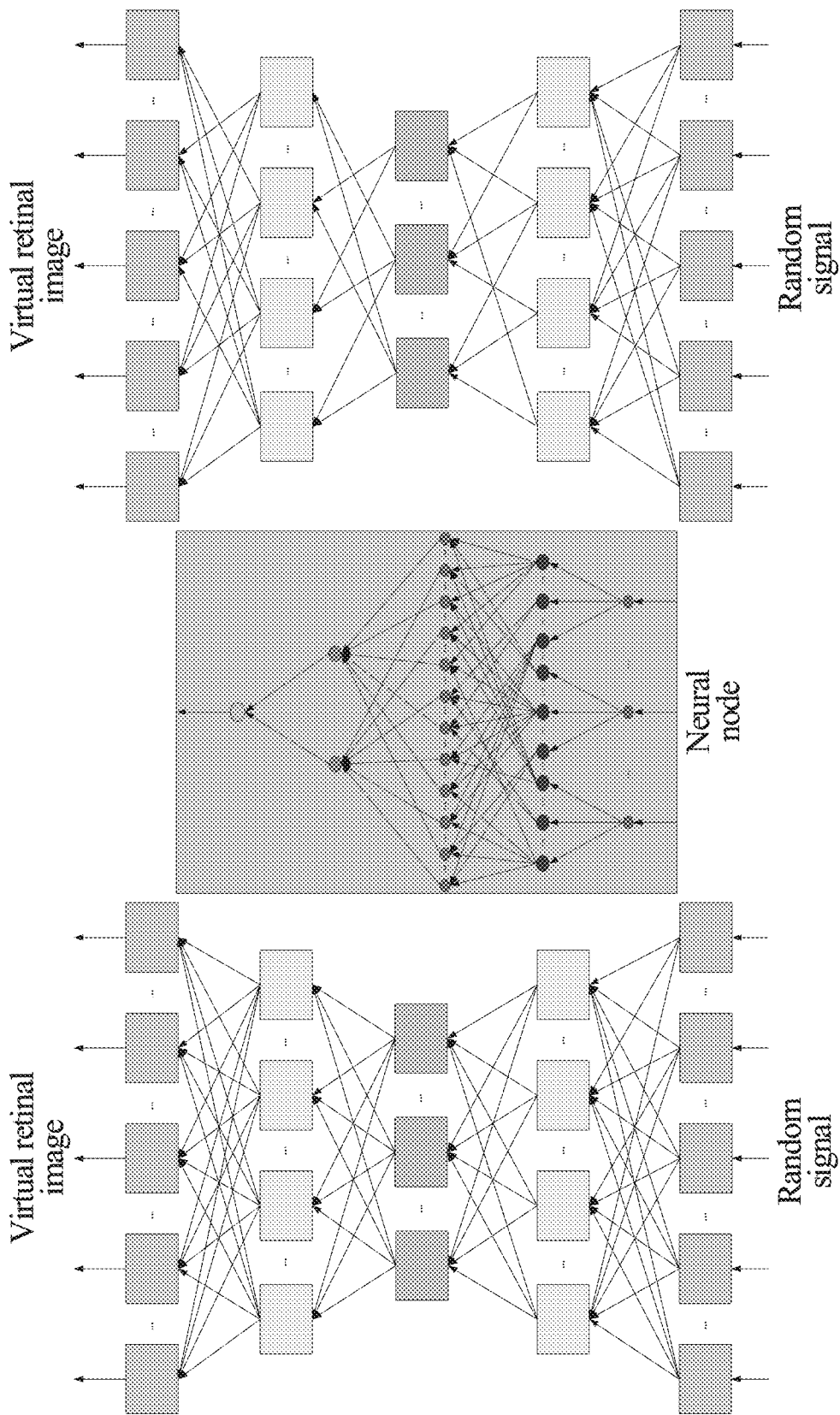
FIG. 4 is a structure diagram of a generator for the generative adversarial network in the method for parallel processing of retinal images according to an embodiment of the disclosure.

The structure of the generator for the generative adversarial network is more complicated than that of the discriminator. It consists of an interval type-2 fuzzy convolutional neural network, a multi-layer interval type-2 fuzzy neural network, etc. Then, an optimal retinal image is selected from their output retinal images according to the decision criterion. The whole process will be described below. The difference between the interval type-2 fuzzy convolutional neural network and the multi-layer interval type-2 fuzzy neural network mainly lies in whether the hidden nodes are completely connected or partially connected according to the convolution operation. The structure of the generator for the generative adversarial network is shown in FIG. 4.

N multi-layer interval type-2 fuzzy neural networks or interval type-2 fuzzy convolutional neural networks are used to generate virtual retinal images. In the training process, they use different objective functions as training objectives, and the random input signal subjects to different prior distributions $p_Z$. Common objective functions comprise:

$$\min_G E_{Z \sim p_Z(Z)}[(D(G(Z))-c)^2], \quad (10a)$$

$$\min_G E_{Z \sim p_Z(Z)}[\log(1-D(G(Z)))], \quad (10b)$$

$$\min_G E_{Z \sim p_Z(Z)}[-D(G(Z))/(1-D(G(Z)))] \quad (10c)$$

The generator is trained according to Formulas (10a)-(10c). N virtual retinal images are obtained, respectively. The finally generated virtual image is selected according to the following criterion:

$$\|\mu_r - \mu_g\|_p + tr(C_r + C_g - 2(C_r C_g)^{1/2}) \quad (11)$$

where $\mu_r$ and $\mu_g$, $C_r$ and $C_g$ denote, respectively, a sample mean vector and covariance matrix of the probability distribution $p_{data}$ of the input real retinal image samples and the probability distribution $p_g$ of the virtual retinal image samples synthesized by the generator; $\|\cdot\|_p$ denotes the p vector norm, and $tr(\cdot)$ denotes the trace of the matrix. The selected virtual retinal image is obtained when Formula (11) is minimized in the generated virtual retinal image.

S103: A parallel multi-layer decomposed interval type-2 intuitionistic fuzzy convolutional neural network is established.

Figure 5:
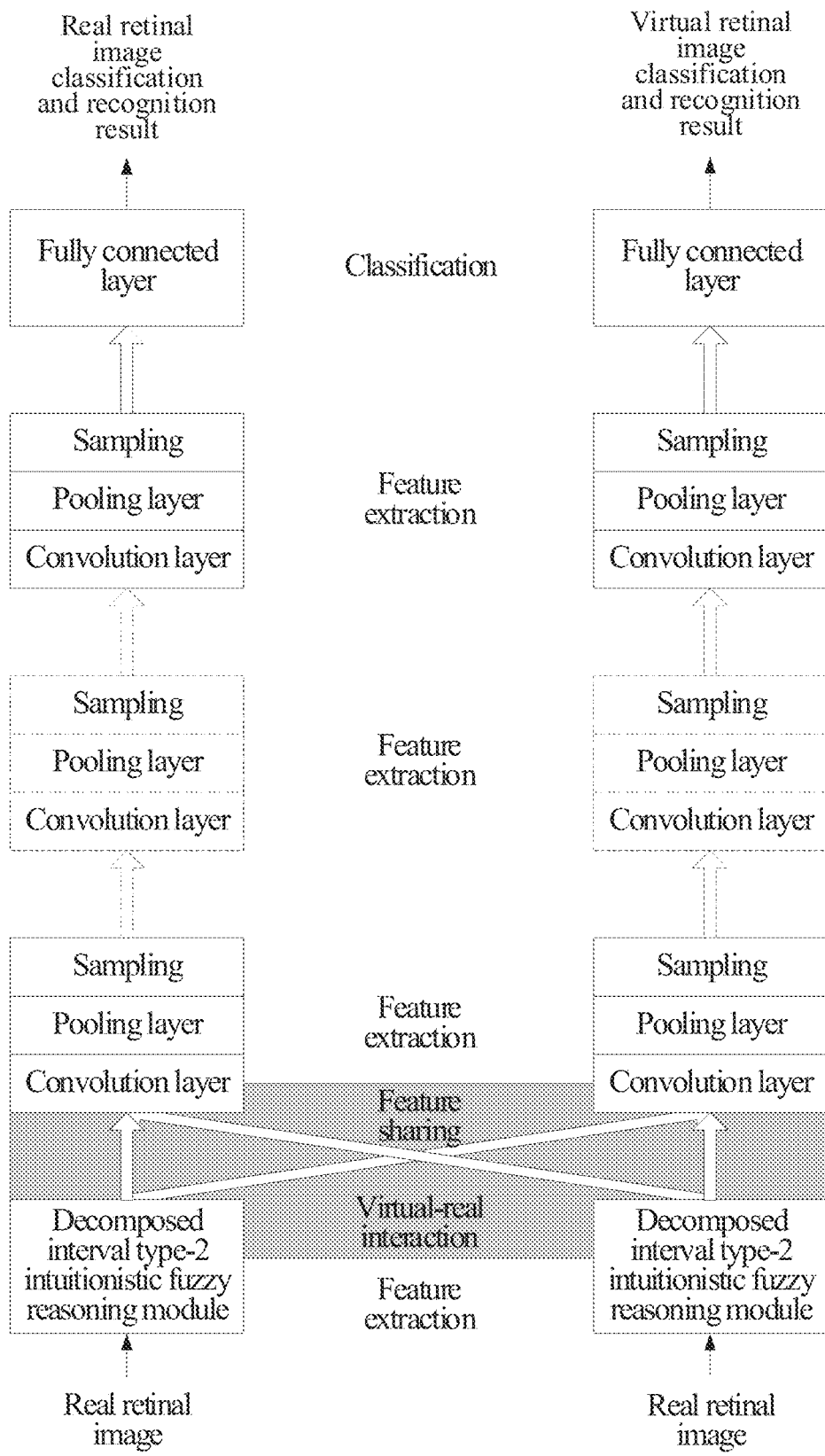
FIG. 5 is a structure diagram of a parallel multi-layer decomposed interval type-2 intuitionistic fuzzy convolutional neural network in the method for parallel processing of retinal images according to an embodiment of the disclosure.

During the establishment of the model, in order to further improve the classification and recognition accuracy and model generalization ability, the disclosure proposes the use of a parallel multi-layer decomposed interval type-2 intuitionistic fuzzy convolutional neural network as a classifier, as shown in FIG. 5. The interval type-2 intuitionistic fuzzy reasoning works well in dealing with uncertain information. At the same time, in order to enhance the feature extraction ability, a decomposed intuitionistic fuzzy reasoning method is further used as the initial feature extraction module of the neural network. On this basis, convolution modules (comprising convolutional layer, pooling layer, sampling layer, etc.) are stacked, and finally the classification and recognition result is output by the classifier (fully connected layer). In the above neural network model, real retinal images and virtual retinal images are subject to feature extraction, respectively, and then features are shared through the interactive mechanism of virtual and real image features to improve the generalization ability and recognition effect of the classification model.

In order to obtain a virtual retinal image that meets the requirements of high-precision classification and recognition, while training to obtain a classifier with good recognition performance and high generalization ability, the disclosure proposes a parallel classification and recognition method. Parallel classification and recognition is a classification and recognition method that uses the interaction and supplement of virtual data and real data to fully train machine learning models (not limited to deep learning) to ensure that the model completes the intended tasks with high quality (high accuracy and high generalization ability).

Figure 6:
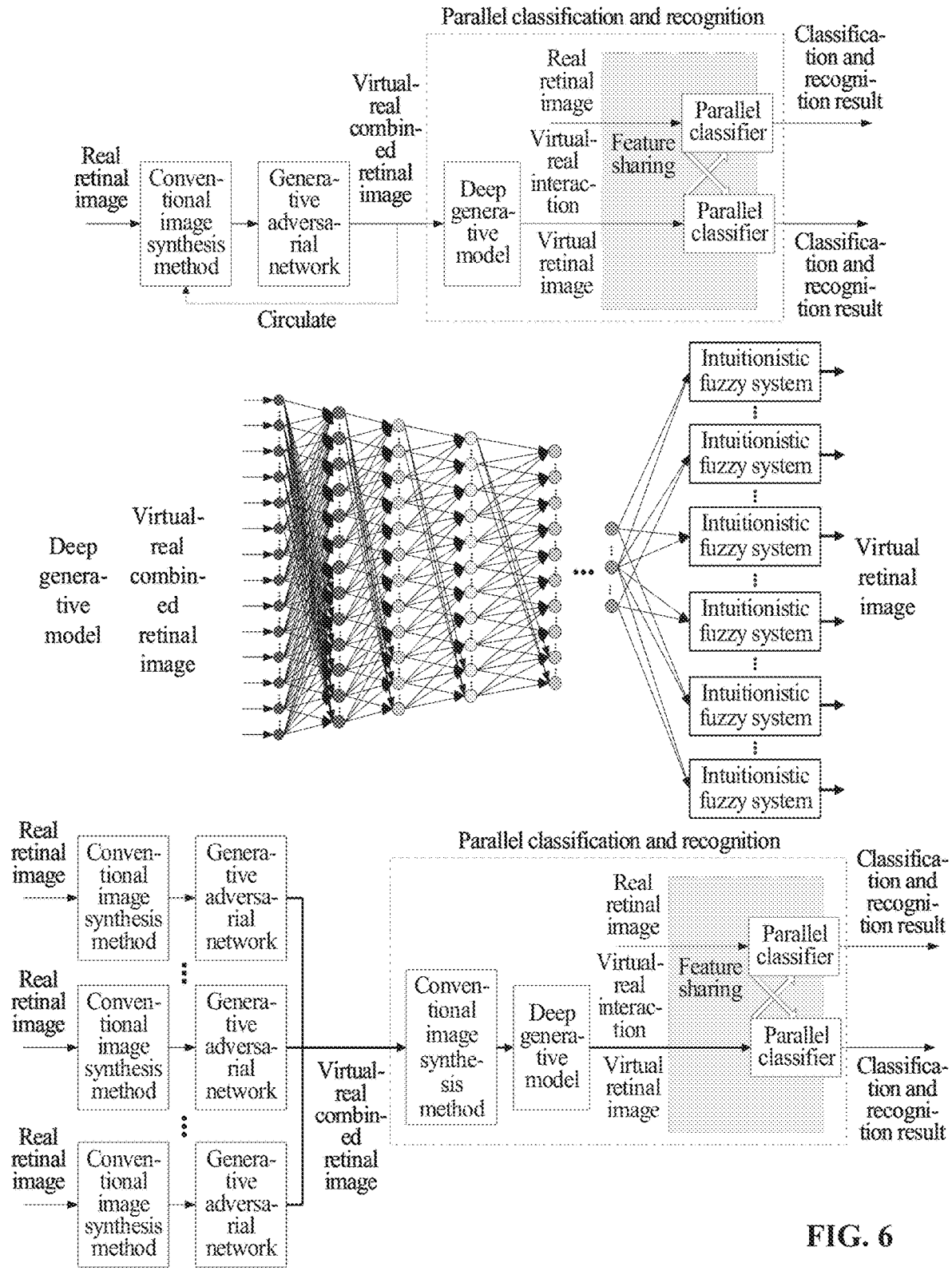
FIG. 6 is a schematic view of a parallel multi-layer decomposed interval type-2 intuitionistic fuzzy convolutional neural network model in the method for parallel processing of retinal images according to an embodiment of the disclosure.

For the parallel multi-layer decomposed interval type-2 intuitionistic fuzzy convolutional neural network model (parallel classifier) as shown in FIG. 6, the multi-layer decomposed interval type-2 intuitionistic fuzzy convolutional neural network with virtual-real interaction is used in the disclosure. The initial feature extraction module of this network uses decomposed interval type-2 intuitionistic fuzzy reasoning, that is, on the basis of interval type-2 intuitionistic fuzzy reasoning, each interval type-2 intuitionistic fuzzy rule is transformed into a corresponding decomposed interval type-2 intuitionistic fuzzy reasoning sub-system. Due to the increase of interval type-2 membership functions and non-membership functions describing the system, representation capability (feature extraction) of the system is further enhanced, providing solid foundation for the subsequent feature extraction of the convolutional module. At the same time, in this layer, the features of the real retinal image and the features of the virtual retinal image are shared, and the representation ability of the parallel classification and recognition model is improved through the "virtual-real interaction" at the feature level. In the process of the decomposed interval type-2 intuitionistic fuzzy reasoning, the degree of membership and the degree of non-membership are sub-intervals of the unit interval, i.e.:

$$\bar{\mu}_{ij}(x_i) = \exp(-(x_i - c_{ij})^2 / \bar{\sigma}_{ij}^2) \quad (12a)$$

$$\underline{\mu}_{ij}(x_i) = \exp(-(x_i - c_{ij})^2 / \underline{\sigma}_{ij}^2) \quad (12b)$$

$$\bar{v}_{ij}(x_i) = 1 - r_{ij} \exp(-(x_i - c_{ij})^2 / \underline{\sigma}_{ij}^2) \quad (12c)$$

$$\underline{v}_{ij}(x_i) = 1 - r_{ij} \exp(-(x_i - c_{ij})^2 / \bar{\sigma}_{ij}^2) \quad (12d)$$

where $\bar{\mu}_{ij}(x_i)$ and $\underline{\mu}_{ij}(x_i)$, $\bar{v}_{ij}(x_i)$ and $\underline{v}_{ij}(x_i)$, respectively denote upper and lower bounds of the membership function and upper and lower bounds of the non-membership function, $c_{ij} \in R$, $\bar{\sigma}_{ij} \geq \underline{\sigma}_{ij} > 0$. The membership function and the non-membership function shown in Formulas (12a)-(12d) are decomposed to obtain:

$$\bar{\mu}_{ij}^l(x_i) = \begin{cases} 1 - \exp(-(x_i - c_{ij})^2 / \sigma_{ij}^2), & x_i < c_{ij} \\ 0, & x_i \geq c_{ij} \end{cases} \quad (13a)$$

$$\underline{\mu}_{ij}^l(x_i) = \begin{cases} 1 - \exp(-(x_i - c_{ij})^2 / \sigma_{ij}^2), & x_i < c_{ij} \\ 0, & x_i \geq c_{ij} \end{cases} \quad (13b)$$

$$\bar{v}_{ij}^l(x_i) = \begin{cases} r_{ij} \exp(-(x_i - c_{ij})^2 / \sigma_{ij}^2), & x_i < c_{ij} \\ r_{ij}, & x_i \geq c_{ij} \end{cases} \quad (13c)$$

$$\underline{v}_{ij}^l(x_i) = \begin{cases} r_{ij} \exp(-(x_i - c_{ij})^2 / \sigma_{ij}^2), & x_i < c_{ij} \\ r_{ij}, & x_i \geq c_{ij} \end{cases} \quad (13d)$$

$$\bar{\mu}_{ij}^c(x_i) = \exp(-(x_i - c_{ij})^2 / \sigma_{ij}^2) \quad (14a)$$

$$\underline{\mu}_{ij}^c(x_i) = \exp(-(x_i - c_{ij})^2 / \sigma_{ij}^2) \quad (14b)$$

$$\bar{v}_{ij}^c(x_i) = 1 - r_{ij} \exp(-(x_i - c_{ij})^2 / \sigma_{ij}^2) \quad (14c)$$

$$\underline{v}_{ij}^c(x_i) = 1 - r_{ij} \exp(-(x_i - c_{ij})^2 / \sigma_{ij}^2) \quad (14d)$$

$$\bar{\mu}_{ij}^r(x_i) = \begin{cases} 1 - \exp(-(x_i - c_{ij})^2 / \sigma_{ij}^2), & x_i > c_{ij} \\ 0, & x_i \leq c_{ij} \end{cases} \quad (15a)$$

$$\underline{\mu}_{ij}^r(x_i) = \begin{cases} 1 - \exp(-(x_i - c_{ij})^2 / \sigma_{ij}^2), & x_i > c_{ij} \\ 0, & x_i \leq c_{ij} \end{cases} \quad (15b)$$

$$\bar{v}_{ij}^r(x_i) = \begin{cases} r_{ij} \exp(-(x_i - c_{ij})^2 / \sigma_{ij}^2), & x_i > c_{ij} \\ r_{ij}, & x_i \leq c_{ij} \end{cases} \quad (15c)$$

$$\underline{v}_{ij}^r(x_i) = \begin{cases} r_{ij} \exp(-(x_i - c_{ij})^2 / \sigma_{ij}^2), & x_i > c_{ij} \\ r_{ij}, & x_i \leq c_{ij} \end{cases} \quad (15d)$$

where $\bar{\mu}^*_{ij}(x_i)$, $\underline{\mu}^*_{ij}(x_i)$, $\bar{v}^*_{ij}(x_i)$, $\underline{v}^*_{ij}(x_i)$ denote upper and lower bounds of the membership function and upper and lower bounds of the non-membership function of the decomposed interval type-2 intuitionistic fuzzy sets; and * denotes l, c, r. The firing interval of the fuzzy rule precondition of the decomposed interval type-2 intuitionistic fuzzy reasoning system is also a subset of the unit interval, i.e.:

$$f_j(X)=[\underline{f}_j(X), \overline{f}_j(X)]=[\mathbb{T}_{i=1}^n \underline{\mu}^*_{ij}(x_i), \mathbb{T}_{i=1}^n \overline{\mu}^*_{ij}(x_i)] \tag{16a}$$

$$g_j(X)=[\underline{g}_j(X), \overline{g}_j(X)]=[\mathbb{S}_{i=1}^n \underline{\nu}^*_{ij}(x_i), \mathbb{S}_{i=1}^n \overline{\nu}^*_{ij}(x_i)] \tag{16b}$$

where $\underline{f}_j(X)$ and $\overline{f}_j(X)$, $\underline{g}_j(X)$ and $\overline{g}_j(X)$, respectively denote upper and lower bounds of the firing interval of the fuzzy rule membership and non-membership functions. The upper and lower bounds of the firing interval are normalized, respectively, to obtain $\underline{f}'_j(X)$ and $\overline{f}'_j(X)$, $\underline{g}'_j(X)$ and $\overline{g}'_j(X)$. When a batch of retinal images $\{x^k\}_{k=1}^N$ is input, four firing strength matrices are obtained by Formulas (13)-(16): $\underline{F}(x^k)$, $\overline{F}(x^k)$, $\underline{G}(x^k)$ and $\overline{G}(x^k)$. The selection of fuzzy rules is performed by singular value decomposition. Important fuzzy rules (corresponding to singular values with high energy) are mapped, by corresponding rules, to sets of the decomposed interval type-2 intuitionistic fuzzy sub-systems $\underline{FS}_j$, $\overline{FS}_j$, $\underline{GS}_j$ and $\overline{GS}_j$, $j=1, 2, \ldots, M$. The rule reserved in each sub-system is $S_j = \underline{FS}_j \cup \overline{FS}_j \cup \underline{GS}_j \cup \overline{GS}_j$. If $S_j = \emptyset$, the sub-system j is deleted. The upper and lower bounds of the firing interval $\underline{f}_j''(X^k)$ and $\overline{f}_j''(X^k)$, $\underline{g}_j''(X^k)$ and $\overline{g}_j''(X^k)$ are calculated and normalized again, and then each sub-system outputs:

$$Out_j^{(1)}(X^k) = m\Sigma_{r=1}^{M_j} w_r(\underline{f}_r^{M_j}(X^k) + \overline{f}_r^{M_j}(X^k)) + n\Sigma_{r=1}^{M_j} v_r(\underline{g}_r^{M_j}(X^k) + \overline{g}_r^{M_j}(X^k)) \tag{17}$$

where $Out_j^{(1)}(X^k)$ denotes the features of the initial feature extraction layer, m, n∈R⁺, m+n=1. $w_r$ and $v_r$ denote the fuzzy rule consequents; and $M_j$ denotes the number of the reserved sub-system fuzzy rules. In the model (parallel classifier) shown in FIG. 6, the real retinal image and the virtual retinal image are input into the parallel multi-layer decomposed interval type-2 intuitionistic fuzzy convolutional neural network. According to Formulas (13)-(17), the output features from the initial feature extraction layer $Rout_j^{(1)}$ and $Vout_j^{(1)}$, shared parameters $p_a$, $c_a$ for the real feature vector $Rout^{(1)}$, and shared parameters $q_a$, $d_a$ for the virtual feature vector $Vout^{(1)}$ are calculated. Then, the input vector of the feature sharing layer is $In_\alpha^{(1)} = p_\alpha Rout^{(1)} + q_\alpha Vout^{(1)} + c_\alpha + d_\alpha$. Its mean vector $MIn_\alpha^{(1)}$ and covariance matrix $CIn_\alpha^{(1)}$ are calculated. After normalization, $NIn_\alpha^{(1)} = \zeta(In_\alpha^{(1)} - MIn_\alpha^{(1)})/\sqrt{CIn_\alpha^{(1)}} + \eta$, where $\zeta$ and $\eta$ are adjustable parameters. By linear or nonlinear activation functions, $NOut^{(1)} = f(NIn^{(1)})$ is obtained. Then, a sampling dropout method that subjects to the Laplace distribution is used to randomly select features from the feature sharing layer as the input to the convolution feature extraction layer, and the relevant convolution calculation feature extraction technologies (filter design, pooling design, sampling strategy design, etc.) are used to extract the corresponding features, and then the fully connected layer and the corresponding activation function (softmax) are used to get the final output (can be the class number between 0-9, or the probability value 0-1 of belonging to a certain class). In the feature extraction process, in order to effectively improve the parameter training effect, a residual function and its variants are used as the activation function. As the virtual retinal image generative network, the convolutional intuitionistic fuzzy deep neural network is adopted. Its feature extraction layer uses convolution calculation to efficiently extract the features of the retinal image. Its output is $Out_i^{(num-1)}$, num is the number of network layers. The last layer of the deep generative network uses an intuitionistic fuzzy reasoning system. The membership function and non-membership function of the preconditions of the fuzzy rules are as follows:

$$\mu_{ij}(Out_i^{(num-1)}) = \tag{18}$$
$$\begin{cases} ((Out_i^{(num-1)} - b_{ij})/(c_{ij} - b_{ij}))^\iota ((a_{ij} - Out_i^{(num-1)})/(a_{ij} - c_{ij}))^k, \\ \quad\quad a_{ij} \le Out_i^{(num-1)} \le b_{ij} \\ 0, \quad \text{else} \end{cases}$$

where $\iota$, $\kappa > 0$, $a_{ij} > b_{ij}$, $c_{ij} = a_{ij}\iota + b_{ij}\kappa/a_{ij} + \kappa$ is the center of the membership function, and $\sigma_{ij} = b_{ij} - a_{ij}$ is the width of the membership function. The corresponding non-membership function is $v_{ij}(Out_i^{(num-1)}) = 1 - r_{ij}\mu_{ij}(Out_i^{(num-1)})$, $0 < r_{ij} < 1$. By the intuitionistic fuzzy reasoning method, the following is obtained:

$$Out^{(num)} = p\Sigma_{j=1}^M w_j \mathbb{T}_{i=1}^n \mu_{ij}(Out_i^{(num-1)}) / \Sigma_{j=1}^M \mathbb{T}_{i=1}^n \mu_{ij}(Out_i^{(num-1)}) + q\Sigma_{j=1}^M v_j \mathbb{S}_{i=1}^n v_{ij}(Out_i^{(num-1)}) / \Sigma_{j=1}^M \mathbb{S}_{i=1}^n v_{ij}(Out_i^{(num-1)}) \tag{19}$$

where p, q∈R⁺, p+q=1, and $w_j$, $v_j$ are intuitionistic fuzzy rule consequents, n is the dimensionality of the input $Out^{(num-1)}$, and M is the number of fuzzy rules.

For the parallel multi-layer decomposed interval type-2 intuitionistic fuzzy convolutional neural network, the parameters for the convolutional intuitionistic fuzzy deep neural network on which the virtual image generation relies are adjusted by a batch gradient descent method, according to the final loss function $E = \frac{1}{2}\Sigma_{k=1}^N ((\gamma_d^r(k) - \gamma^r(k))^2 + (\gamma_d^v(k) - \gamma^v(k))^2)$, and gradient vector $\nabla E(\Theta) = (\partial E/\partial \theta_1, \ldots, \partial E/\partial \theta_{Num})$. Num denotes the number of parameters to be adjusted.

S104: An integrated parallel multi-layer decomposed interval type-2 intuitionistic fuzzy convolutional neural network classification and recognition model is established.

Figure 7:
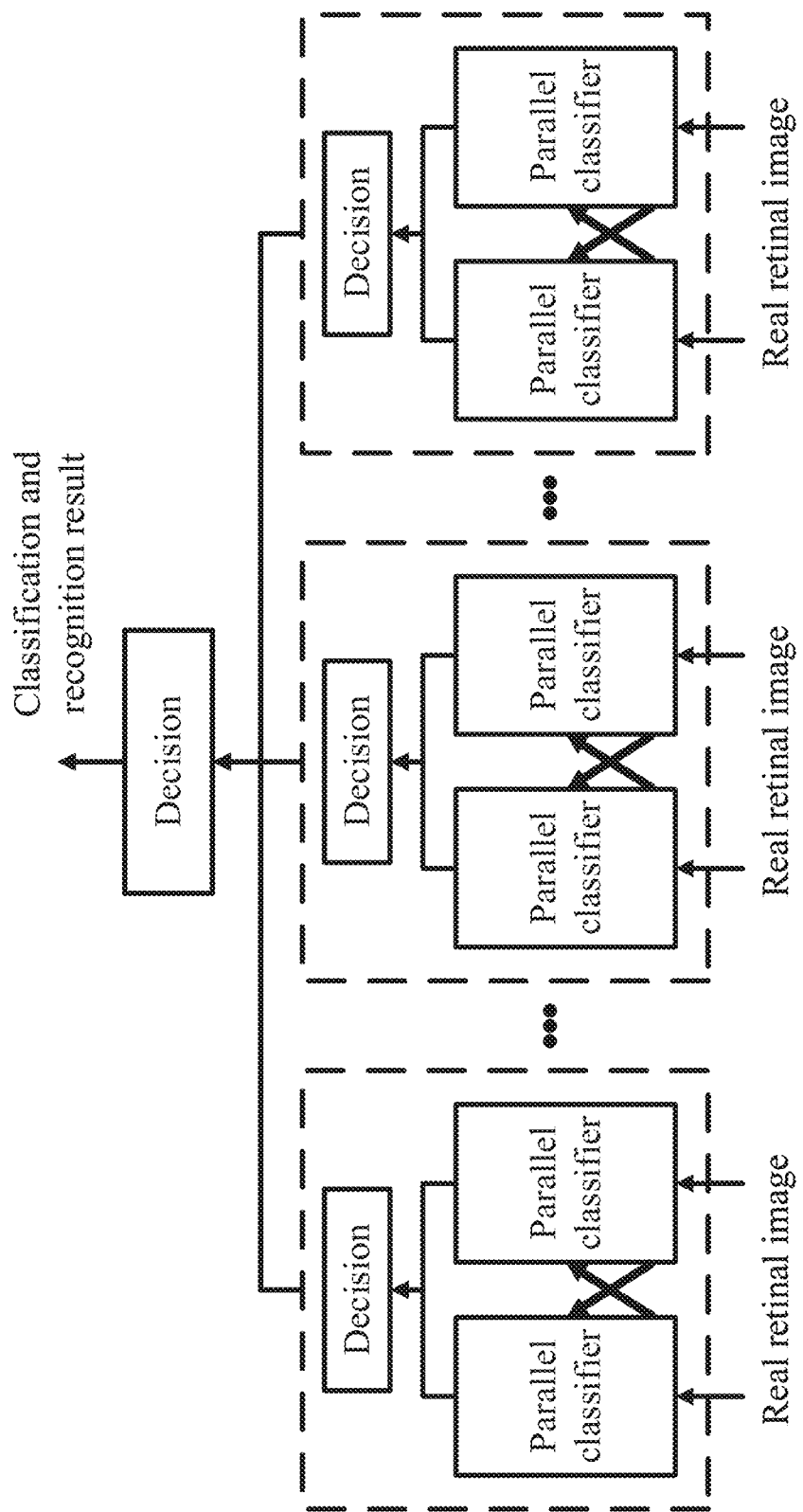
FIG. 7 is a schematic view of an integrated parallel multi-layer decomposed interval type-2 intuitionistic fuzzy convolutional neural network model in the method for parallel processing of retinal images according to an embodiment of the disclosure.

Ensemble learning is a very cutting-edge technology in machine learning. Using ensemble learning can get a machine learning model with higher accuracy and better generalization performance than using a single classifier. In the disclosure, a novel ensemble method is used to integrate the recognition outputs (class numbers) of D parallel multi-layer decomposed interval type-2 intuitionistic fuzzy convolutional neural networks (parallel classifiers) as the final classification and recognition result, and the integrated parallel classification and recognition model is shown in FIG. 7. The specific process comprises the following steps.

S104A: The decider training data is generated.

For the D parallel classifiers obtained in the S103, retinal images $\{Img_e^k\}_{k=1}^{N_e}$ that are different from those previously used for training are used as the decider training dataset (real retinal images). That is, they are applied to the real and virtual ends of the previously trained D parallel classifiers. The D parallel classifiers respectively output a corresponding class number or probability of belonging to a certain class $\{sr_e^k\}_{k=1}^{N_e}$ and $\{sv_e^k\}_{k=1}^{N_e}$, to which weights for real and virtual ends wr and wv are applied to obtain $s_e^k = wrsr_e^k + wvsv_e^k$, thus to form a decider training dataset $\{S_e^k, Es_e^k\}_{k=1}^{N_e}$, where $S_e^k = (s_{1e}^k, \ldots, s_{De}^k)$, $Es_e^k$ is the corresponding output label, and $N_e$ is the number of samples in the decider training dataset.

S104B: An intuitionistic fuzzy decider based on hybrid parameter optimization is established by the generated decider training dataset.

A decider based on hybrid parameter optimization is generated by the decider training samples. The output of the decider is as follows:

$$Ys_e^k = \alpha \Sigma_{j=1}^M w_j \, \mathbb{T}_{i=1}^D \mu_{ij}(s_{ie}^k)/\Sigma_{j=1}^M \mathbb{T}_{i=1}^D \mu_{ij}(s_{ie}^k) + (1-\alpha)\Sigma_{j=1}^M v_j \, \mathbb{S}_{i=1}^D v_{ij}(s_{ie}^k)/\Sigma_{j=1}^M \mathbb{S}_{i=1}^D v_{ij}(s_{ie}^k) \quad (20)$$

where $\alpha \in (0,1)$, $Ys_e^k$ denotes the final output from the decider, and $s_{ie}^k$ denotes the output from the ith parallel multi-layer decomposed interval type-2 intuitionistic fuzzy convolutional neural network, $i=1, \ldots, D$; $\mathbb{T}_{i=1}^D$ and $\mathbb{S}_{i=1}^D$ denote $\mathbb{T}$ and $\mathbb{S}$ operations from 1 to D. The precondition parameters for the intuitionistic fuzzy decider are adjusted by a batch gradient descent method, and its consequent parameters are estimated by least square method. The whole process comprises the following steps.

S104B.1: The center $c_{ij}$, the width $\sigma_{ij}$ and the scale coefficient $r_{ij}$ for the precondition membership function and non-membership function of the intuitionistic fuzzy decider are randomly initialized, and then the precondition parameters are adjusted by the batch gradient descent method.

$$\nabla E(c_{ij}, \sigma_{ij}, r_{ij}, \alpha) = (\partial E/\partial c_{ij}, \partial E/\partial \sigma_{ij}, \partial E/\partial r_{ij}, \partial E/\partial \alpha) \quad (21)$$

where $\nabla E(c_{ij}, \sigma_{ij}, r_{ij}, \alpha)$ denotes the gradient vector, $E = \frac{1}{2}\Sigma_{k=1}^{N_b}(Ys_e^k - Es_e^k)^2$, which is the loss function, and $N_b$ denotes the number of data in each batch.

S104B.2: The firing strengths for the fuzzy rule membership function and non-membership function are calculated by using the parameters adjusted in the S104B.1, i.e., $f_j(S_e^k)$ and $g_j(S_e^k)$, and normalized to obtain $f'_j(S_e^k) = f_j(S_e^k)/\Sigma_{j=1}^M f_j(S_e^k)$ and $g'_j(S_e^k) = g_j(S_e^k)/\Sigma_{j=1}^M g_j(S_e^k)$; for a batch of data, matrices F' and G' may be obtained:

$$F' = \begin{bmatrix} f'_1(S_e^1) & \cdots & f'_M(S_e^1) \\ \vdots & \ddots & \vdots \\ f'_1(S_e^{N_b}) & \cdots & f'_M(S_e^{N_b}) \end{bmatrix}, \quad (22)$$

$$G' = \begin{bmatrix} g'_1(S_e^1) & \cdots & g'_M(S_e^1) \\ \vdots & \ddots & \vdots \\ g'_1(S_e^{N_b}) & \cdots & g'_M(S_e^{N_b}) \end{bmatrix}$$

According to Formula (22), $\Phi = [\alpha F' | (1-\alpha) G']$ is obtained; for some consequent parameters of the fuzzy rule membership function $W = [w_1 \ldots w_M]^T$ and the other consequent parameters of the fuzzy rule non-membership function $V = [v_1 \ldots v_M]^T$, the parameter vector $\Theta = [W^T V^T]^T$ is obtained, where $\Phi \Theta = ES_e$ according to Formula (20) because $\Phi$ is a $N_b \times 2M$ matrix and $ES_e$ is a $N_b \times 1$ output label vector, and a consequent parameter vector $\Theta = \Phi^+ ES_e$ is obtained by generalized inverse.

Figure 8:
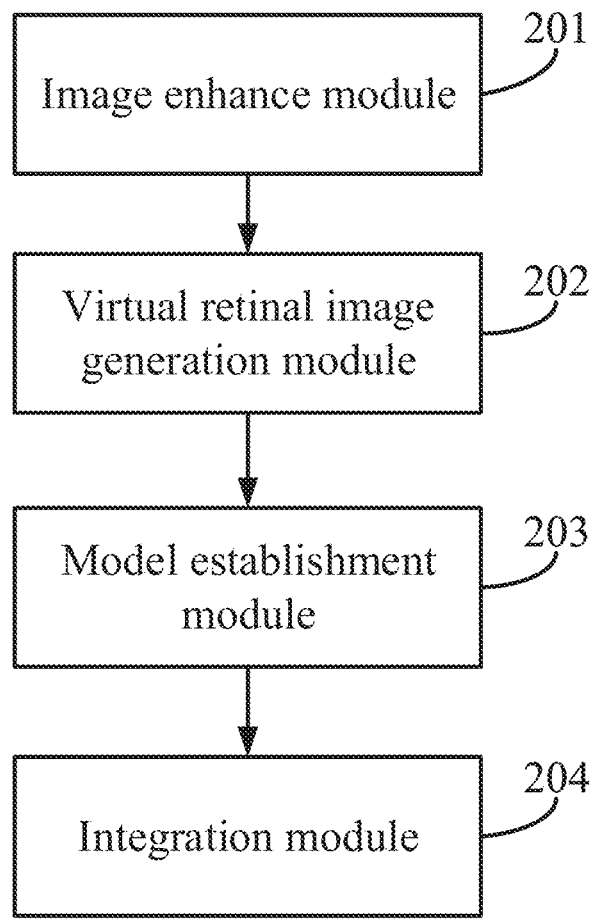
FIG. 8 is a structure diagram of a device for parallel processing of retinal images according to an embodiment of the disclosure.

On the basis of the above embodiments, as shown in FIG. 8, the present application further discloses a device for parallel processing of retinal images, comprising:

an image enhancement module 201 configured to optimize an objective function with a chaotic supply-demand algorithm to enhance a real retinal image;

a virtual retinal image generation module 202 configured to synthesize a virtual retinal image by a hybrid image generation method;

a model establishment module 203 configured to establish a parallel multi-layer decomposed interval type-2 intuitionistic fuzzy convolutional neural network model based on the virtual retinal image and the enhanced real retinal image; and an ensemble module 204 configured to integrate outputs from a plurality of parallel multi-layer decomposed interval type-2 intuitionistic fuzzy convolutional neural network models as a final classification result.

Further, the image enhancement module 201 comprises:

a function transformation sub-module configured to perform function transformation M on the input original real retinal image to obtain an enhanced output image, i.e.:

$$EI(i,j) = M(I(i,j)|\theta) \quad (1)$$

where $I(i, j)$ denotes a part of the input original real retinal image, and $EI(i, j)$ denotes a corresponding part of the enhanced retinal image, $i, j=1, 2, \ldots, n$; $\theta = (r, \beta, \rho, \sigma)$ is an undetermined parameter for the function; $M(I(i, j)|\theta) = M(I(i, j)|r, \beta, \rho, \sigma) = rP/(s(i, j)+\beta)(I(i, j) - \rho \times \overline{P}(i, j)) + \overline{P}(i, j)^\sigma$ denotes an image enhancement function, $\overline{P}(i, j) = \Sigma_{p=1}^n \Sigma_{q=1}^n P(p, q)/n^2$ denotes the average of local pixels of the input original real retinal image, $s(i, j) = (\Sigma_{p=1}^n \Sigma_{q=1}^n (P(p, q) - \overline{P}(i, j))^2)^{1/2}/n$ denotes a mean square error of local pixels of the input original real retinal image, $P(p, q)$ denotes a pixel, n denotes the number of local pixels of the input original real retinal image, and P denotes a mean of all pixels; and a parameter determination sub-module configured to set a respective objective function $J(\theta)$ according to the requirements of image enhancement, and obtain parameter values when the objective function is optimized by the chaotic supply-demand algorithm, in order to obtain a reasonable image enhancement and transformation function, thus to obtain a satisfactory enhanced retinal image:

$$J(\theta) = npe(EI(\theta)) \times \log(\log(EI(\theta))) \times entropy(EI(\theta)) \quad (2)$$

where $J(\theta)$ denotes the objective function, $npe(EI(\theta))$ denotes the number of pixels at the edge of the image, $\log(\log(EI(\theta)))$ denotes the Sobel operator for the density at the edge of the image, $entropy(EI(\theta)) = \Sigma_{t=1}^{256} p_t \log_2 p_t$, where $p_t$ denotes the probability of the tth brightness level of the enhanced image;

the chaotic supply-demand algorithm comprises:

initializing market populations:

given the number of populations is $N_p$ and the dimensionality of a product price vector $p_i$ and of a production quantity vector $q_i$ is $\dim(\theta)=4$, determining a value range for $p_i$ and $q_i$ according to the search range for parameters in each dimension in a parameter vector $\theta = (r, \beta, \rho, \sigma)$, $p_{ij} = [\underline{p}_j, \overline{p}_j]$, $q_{ij} = [\underline{q}_j, \overline{q}_j]$;

selecting, for $p_{ij}$ and $q_{ij}$, uniformly distributed random numbers in a unit interval respectively to obtain an initial unit product price population $p_i(0)$ and quantity population $q_i(0)$;

then, iteratively calculating a two-dimensional Ikeda map by respectively using $p_{ij}(0)$ and $q_{ij}(0)$ as initial values, to obtain a candidate initial product price population $p_i$ and quantity population $q_i$ by chaos iteration, $1 \le i \le N_p N_T$, where $N_T$ denotes the number of iterations;

then, for $p_{ij}$ and $q_{ij}$ in each dimension, performing linear transformation to obtain a candidate initial product price $\tilde{p}_i$ and quantity $\tilde{q}_i$; and calculating, according to Formula (2), an objective function value $J(\tilde{p}_i)$ and $J(\tilde{q}_i)$ respectively for the price and quantity of each product in a population and then normalizing, respectively comparing the objective function values $J(\tilde{p}_i)$ and $J(\tilde{q}_i)$ with the uniformly distributed random numbers, and selecting $N_p$ product prices and quantities to form the initial production price population and quantity population;

determining the value of parameters and calculating the initial optimal product:

comparing the objective function values of the price and quantity of a product in the initial population, and replacing $\tilde{p}_i$ with $\tilde{q}_i$ if $J(\tilde{p}_i)<J(\tilde{q}_i)$, where the product price with the greatest objective function value is $\tilde{p}_{best}=\operatorname{argmax}_{1\le i\le N_p}J(\tilde{p}_i)$;

performing the following iteration process when the number of iterations $t\le Ter$, where Ter denotes the maximum number of iterations:

calculating the absolute variance of the objective function for the quantity of a product in a population, normalizing, and selecting the product quantity $\tilde{q}_k$ as the equilibrium point $\tilde{q}_e$ according to the roulette method; while for the determination of the equilibrium point for the price of a product, comprising two stages: in the first stage, at $t\le Ter/2$, calculating the absolute variance of the objective function for the price of a product in a population, normalizing, and selecting the product price $\tilde{p}_l$ as the equilibrium point $\tilde{p}_e$ according to the roulette method, and in the second stage, at $t>Ter/2$, using the average of the price of the product in the population as the equilibrium point;

comparing the objective function values, replacing $\tilde{p}_i(t+1)$ with $\tilde{q}_i(t+1)$ if $J(\tilde{p}_i(t+1))<J(\tilde{q}_i(t+1))$, $\tilde{p}_b(t+1)=\operatorname{argmax}_{1\le m\le N_p}J(\tilde{p}_m(t+1))$, if $J(\tilde{p}_b(t+1))>J(\tilde{p}_{best})$, then $\tilde{p}_{best}=\tilde{p}_b(t+1)$ otherwise keeping $\tilde{p}_{best}$ unchanged; and disturbing by logistic chaotic mapping if $\tilde{p}_{best}$ remains unchanged after ten remains successive iterations and Ter has not yet been reached; and at the end of iteration, outputting the optimal solution $\tilde{p}_{best}$, where the enhanced image $EI=M(I|\tilde{p}b_{est})$ is the desired enhanced retinal image.

Further, the virtual retinal image generation module 202 comprises:

a geometric transformation configured to preliminarily generate a virtual retinal image from an actually collected retinal image by geometric transformation:

input a real retinal image $RIm_i$, and apply a geometric transformation operator $T_g$ to the real image to obtain a virtual retinal image $SIm_j$, $i=1, 2, \ldots, n$, $j=1, 2, \ldots, m$:

$$SIm_j=T_g(RIm_i) \quad (7)$$

where $T_g$ is one of flip, clip, rotate, translate geometric transformation operators or a composition operator thereof; and a virtual retinal image generation sub-module configured to generate, according to the preliminarily generated virtual retinal image and the real retinal image, a new virtual retinal image by using a generative adversarial network, where a discriminator for the generative adversarial network consists of a decomposed fuzzy broad convolutional neural network and a generator for the generative adversarial network consists of a plurality of interval type-2 fuzzy convolutional neural networks and/or multi-layer interval type-2 fuzzy neural network;

train the generator by using different objective functions as training objectives to obtain a plurality of virtual retinal images, and select a finally generated virtual image from those virtual retinal images according to the following criterion:

$$\|\mu_r-\mu_g\|_p+tr(C_r+C_g-2(C_rC_g)^{1/2}) \quad (11)$$

where $\mu_r$ and $\mu_g$, $C_r$ and $C_g$ denote, respectively, a sample mean vector and covariance matrix of the probability distribution $p_{data}$ of the input real retinal image samples and the probability distribution $p_g$ of the virtual retinal image samples synthesized by the generator; $\|\cdot\|_p$ denotes the p vector norm, and $tr(\cdot)$ denotes the trace of the matrix; and obtain the selected virtual retinal image when Formula (11) is minimized in the generated virtual retinal image.

Further, the model establishment module 203 comprises:

a model establishment sub-module configured to establish a parallel multi-layer decomposed interval type-2 intuitionistic fuzzy convolutional neural network; and a model training sub-module configured to input the virtual retinal image and the enhanced real retinal image into the parallel multi-layer decomposed interval type-2 intuitionistic fuzzy convolutional neural network, perform feature extraction and feature sharing, perform convolutional calculation based on the shared features to further extract relevant features, obtain, based on the relevant features, a final output which is the class number or the probability of belonging to a certain class, and perform network training according to the above process to obtain the parallel multi-layer decomposed interval type-2 intuitionistic fuzzy convolutional neural network.

Further, the ensemble module 204 comprises:

a decider training dataset establishment sub-module configured to establish a decider training dataset $\{S_e^k, Es_e^k\}_{k=1}^{N_e}$, where $S_e^k$ is the output vector from the individual deciders. $s_e^k=wr\,sr_e^k+wv\,sv_e^k$, wr and wv respectively denote weights for real and virtual ends, $sr_e^k$ and $sv_e^k$ respectively denote the class number or the probability of belonging to a certain class for the real and virtual ends of the individual decider, $k=1, \ldots, N_e$, $N_e$ denotes the number of samples in the decider training dataset, $S_e^k=(s_{1e}^k,\ldots,s_{De}^k)$, $s_{ie}^k$ denotes the output from the ith parallel multi-layer decomposed interval type-2 intuitionistic fuzzy convolutional neural network, $i=1, \ldots, D$, and $Es_e^k$ denotes the output label; and an intuitionistic fuzzy decider establishment sub-module configured to train, by the established decider training dataset, an intuitionistic fuzzy decider based on hybrid parameter optimization:

$$Ys_e^k=\alpha\Sigma_{j=1}^M w_j\mathbb{T}_{i=1}^D\mu_{ij}(s_{ie}^k)/\Sigma_{j=1}^M\mathbb{T}_{i=1}^D\mu_{ij}(s_{ie}^k)+$$
$$(1-\alpha)\Sigma_{j=1}^M v_j\mathbb{S}_{i=1}^D v_{ij}(s_{ie}^k)/\Sigma_{j=1}^M\mathbb{S}_{i=1}^D v_{ij}(s_{ie}^k) \quad (20)$$

where $\alpha\in(0,1)$, $Ys_e^k$ denotes the final output from the decider, and $s_{ie}^k$ denotes the output from the ith parallel multi-layer decomposed interval type-2 intuitionistic fuzzy convolutional neural network, $i=1, \ldots, D$; $w_j$ and $v_j$ denote the intuitionistic fuzzy rule consequents; $\mathbb{T}$ and $\mathbb{S}$ denote the triangular norm and triangular conorm; $j=1, 2, \ldots, M$, M denotes the number of fuzzy rules; $\mathbb{T}_{i=1}^D$ and $\mathbb{S}_{i=1}^D$ denote $\mathbb{T}$ and $\mathbb{S}$ operations from 1 to D; and adjusting the precondition parameters of the intuitionistic fuzzy decider by a batch gradient descent method, and estimating the consequent parameters of the intuitionistic fuzzy decider by least square method. The whole process comprising:

randomly initializing the center $c_{ij}$, the width $\sigma_{ij}$ and the scale coefficient $r_{ij}$ for the precondition membership function and non-membership function of the intuitionistic fuzzy decider, and adjusting the precondition parameters by the batch gradient descent method:

$$\nabla E(c_{ij},\sigma_{ij},r_{ij},\alpha)=(\partial E/\partial c_{ij},\partial E/\partial\sigma_{ij},\partial E/\partial r_{ij},\partial E/\partial\alpha) \quad (21)$$

where $\nabla E(c_{ij}, \sigma_{ij}, r_{ij}, \alpha)$ denotes the gradient vector, $E=\frac{1}{2}\Sigma_{k=1}^{N_b}(Ys_e^k-Es_e^k)^2$, which is the loss function, and $N_b$ denotes the number of data in each batch;

calculating the firing strengths for a fuzzy rule membership function and a fuzzy rule non-membership function by using the precondition parameters adjusted in Formula (21), i.e., $f_j(S_e^k)$ and $g_j(S_e^k)$, and normalizing to obtain $f'_j(S_e^k)=f_j(S_e^k)/\Sigma_{j=1}^M f_j(S_e^k)$ and $g'_j(S_e^k)=g_j(S_e^k)/\Sigma_{j=1}^M g_j(s_e^k)$; for a batch of data, obtaining matrices F' and G':

$$F' = \begin{bmatrix} f'_1(S_e^1) & \cdots & f'_M(S_e^1) \\ \vdots & \ddots & \vdots \\ f'_1(S_e^{N_b}) & \cdots & f'_M(S_e^{N_b}) \end{bmatrix}, \quad (22)$$

$$G' = \begin{bmatrix} g'_1(S_e^1) & \cdots & g'_M(S_e^1) \\ \vdots & \ddots & \vdots \\ g'_1(S_e^{N_b}) & \cdots & g'_M(S_e^{N_b}) \end{bmatrix}$$

according to Formula (22), obtaining a matrix synthesized by F' and G': $\Phi=[\alpha F'|(1-\alpha)G']$; for some consequent parameters of the fuzzy rule membership function $W=[w_1 \ldots w_M]^T$ and the other consequent parameters of the fuzzy rule non-membership function $V=[v_1 \ldots v_M]^T$, obtaining a parameter vector $\Theta=[W^T V^T]^T$, where $\Phi\Theta=ES_e$ according to Formula (20) because $\Phi$ is a $N_b \times 2M$ matrix and $ES_e$ is a $N_b \times 1$ output label vector, and obtaining a consequent parameter vector $\Theta=\Phi^+ ES_e$ by generalized inverse.

It will be obvious to those skilled in the art that changes and modifications may be made, and therefore, the aim in the appended claims is to cover all such changes and modifications.

What is claimed is:

1. A method, comprising:
1) optimizing an objective function with a chaotic supply-demand algorithm to enhance a real retinal image to obtain an enhanced real retinal image;
2) synthesizing a virtual retinal image by a hybrid image generation method;
3) stablishing a parallel multi-layer decomposed interval type-2 intuitionistic fuzzy convolutional neural network model based on the virtual retinal image and the enhanced real retinal image; and
4) integrating outputs from a plurality of parallel multi-layer decomposed interval type-2 intuitionistic fuzzy convolutional neural network models as a final classification result;
wherein
1) is implemented as follows:
1.1) performing function transformation M on the real retinal image to obtain an enhanced output image:

$$EI(i,j)=M(I(i,j)|\theta) \quad (1)$$

where I(i, j) denotes a part of the real retinal image, and EI(i, j) denotes a corresponding part of the enhanced retinal image, i, j=1, 2, . . . , n; $\theta=(r, \beta, \rho, \sigma)$ is an undetermined parameter of the function (1);
$M(I(i, j)|\theta)=M(I(i, j)|r, \beta, \rho, \sigma)=rP/(s(i, j)+\beta)(I(i, j)-\rho \times \bar{P}(i, j))+\bar{P}(i, j)^\sigma$ denotes an image enhancement function, $\bar{P}(i, j)=\Sigma_{p=1}^n \Sigma_{q=1}^n P(p, q)/n^2$ denotes the average of local pixels of the real retinal image, $s(i,j)=(\Sigma_{p=1}^n \Sigma_{q=1}^n (P(p, q)-\bar{P}(i, j))^2)^{1/2}/n$ denotes a mean square error of local pixels of the real retinal image, P(p, q) denotes a pixel, n denotes a number of local pixels of the real retinal image, and P denotes a mean of all pixels;
1.2) setting a respective objective function $J(\theta)$ according to requirements of image enhancement, and obtaining parameter values when the objective function is optimized by the chaotic supply-demand algorithm, thus obtaining a reasonable image enhancement transformation function, and obtaining the enhanced real retinal image:

$$J(\theta)=npe(EI(\theta)) \times \log(\log(EI(\theta))) \times entropy(EI(\theta)) \quad (2)$$

where $J(\theta)$ denotes the objective function, $npe(EI(\theta))$ denotes the number of pixels at an edge of the enhanced output image, $\log(\log(EI(\theta)))$ denotes the Sobel operator for a density at the edge of the enhanced output image, $entropy(EI(\theta))=-\Sigma_{t=1}^{256} p_t \log_2 p_t$, where $p_t$ denotes a probability of the tth brightness level of the enhanced image;
the chaotic supply-demand algorithm comprises:
1.2.1) initializing market populations:
given the number of populations is $N_p$ and the dimensionality of a product price vector $p_i$ and of a production quantity vector $q_i$ is $\dim(\theta)=4$, determining a value range for $p_i$ and $q_i$ according to a search range for parameters in each dimension in a parameter vector $\theta=(r, \beta, \rho, \sigma)$, $p_{ij}=[\underline{p}_j, \overline{p}_j]$, $q_{ij}=[\underline{q}_j, \overline{q}_j]$;
selecting, for $p_{ij}$ and $q_{ij}$, uniformly distributed random numbers in a unit interval respectively to obtain an initial unit product price population $p_i(0)$ and quantity population $q_i(0)$;
iteratively calculating a two-dimensional Ikeda map by respectively using $p_{ij}(0)$ and $q_{ij}(0)$ as initial values, to obtain a candidate initial product price population $p_i$ and quantity population $q_i$ by chaos iteration, $1 \leq i \leq N_p N_T$, where $N_T$ denotes a number of iterations;
for $p_{ij}$ and $q_{ij}$ in each dimension, performing linear transformation to obtain a candidate initial product price $\tilde{p}_i$ and quantity $\tilde{q}_i$; and
calculating, according to Formula (2), an objective function value $J(\tilde{p}_i)$ and $J(\tilde{q}_i)$ respectively for the price and quantity of each product in a population and then normalizing, respectively comparing the objective function values $J(\tilde{p}_i)$ and $J(\tilde{q}_i)$ with the uniformly distributed random numbers, and selecting $N_p$ product prices and quantities to form an initial production price population and an initial quantity population;
1.2.2) determining the value of parameters and calculating an initial optimal product:
comparing the objective function values of the price and quantity of a product in the initial production price population and in the initial quantity population, respectively, and replacing $\tilde{p}_i$ with $\tilde{q}_i$ if $J(\tilde{p}_i) < J(\tilde{q}_i)$, where the product price with the greatest objective function value is $\tilde{p}_{best}=\mathrm{argmax}_{1 \leq i \leq N_p} J(\tilde{p}_i)$;
1.2.3) performing the following iteration process when the number of iterations $t \leq Ter$, where Ter denotes a maximum number of iterations:
calculating an absolute variance of the objective function for the quantity of a product in a population, normalizing, and selecting the product quantity $\tilde{q}_k$ as an equilibrium quantity point $\tilde{q}_e$ according to an roulette method; while for the determination of an equilibrium point for the price of a product, comprising two stages: in the first stage, at $t \leq Ter/2$, calculating the absolute variance of the objective function for the price of a product in a population, normalizing, and selecting the product price $\tilde{p}_l$ as an equilibrium point $\tilde{p}_e$ according to the roulette method, and in the second stage, at $t > Ter/2$, using the average of the product price in the population as the equilibrium point for the price of a product;
comparing the objective function values, replacing $\tilde{p}_i(t+1)$ with $\tilde{q}_i(t+1)$ if $J(\tilde{p}_i(t+1)) < J(\tilde{q}_i(t+1))$, $\tilde{p}_b(t+1)=\mathrm{argmax}_{1 \leq m \leq N_p} J(\tilde{p}_m(t+1))$, if $J(\tilde{p}_b(t+1)) > J(\tilde{p}_{best})$, then $\tilde{p}_{best}=\tilde{p}_b(t+1)$, otherwise keeping $\tilde{p}_{best}$ unchanged; and disturbing by logistic chaotic mapping if $\tilde{p}_{best}$ remains unchanged after ten successive iterations and Ter has not yet been reached;

1.2.4) at the end of iteration, outputting an optimal solution $\tilde{p}_{best}$, where an enhanced image $EI=M(I|\tilde{p}_{best})$ is the enhanced real retinal image.

2. The method of claim 1, wherein 2) is implemented as follows:
   2.1) preliminarily generating the virtual retinal image from the real retinal image by geometric transformation;
   inputting the real retinal image $RIm_i$, and applying a geometric transformation operator $T_g$ to the real retinal image to obtain the virtual retinal image $SIm_j$, i=1, 2, ..., n, j=1, 2, ..., m:

$$SIM_j=T_g(RIm_i) \quad (7)$$

where $T_g$ is one of flip, clip, rotate, translate geometric transformation operators or a composition operator thereof;
   2.2) generating, according to a preliminarily generated virtual retinal image and the real retinal image, a new virtual retinal image by using a generative adversarial network, where a discriminator for the generative adversarial network consists of a decomposed fuzzy broad convolutional neural network and a generator for the generative adversarial network consists of a plurality of interval type-2 fuzzy convolutional neural networks and/or multi-layer interval type-2 fuzzy neural network;
   training the generator by using different objective functions as training objectives to obtain a plurality of virtual retinal images, and selecting a finally generated virtual image from the plurality of virtual retinal images according to the following criterion:

$$\|\mu_r-\mu_g\|_p+tr(C_r+C_g-2(C_rC_g)^{1/2}) \quad (11)$$

where $\mu_r$ and $\mu_g$, $C_r$ and $C_g$ denote, respectively, a sample mean vector and covariance matrix of a probability distribution $p_{data}$ of real retinal image samples and a probability distribution $p_g$ of virtual retinal image samples synthesized by the generator; $\|\cdot\|_p$ denotes the p vector norm, and tr(•) denotes the trace of the matrix; and
   obtaining the virtual retinal image when Formula (11) is minimized in a generated virtual retinal image.

3. The method of claim 2, wherein 3) is implemented as follows:
   3.1) establishing the parallel multi-layer decomposed interval type-2 intuitionistic fuzzy convolutional neural network; and
   3.2) inputting the virtual retinal image and the enhanced real retinal image into the parallel multi-layer decomposed interval type-2 intuitionistic fuzzy convolutional neural network, performing feature extraction and feature sharing, performing convolution calculation based on the shared features to further extract relevant features, obtaining, based on the relevant features, a final output which is the class number or the probability of belonging to a certain class, and performing network calculation according to the above process to obtain the parallel multi-layer decomposed interval type-2 intuitionistic fuzzy convolutional neural network and then output.

4. The method of claim 3, wherein 4) is implemented as follows:
   4.1) establishing a decider training dataset $\{S_e^k, Es_e^k\}_{k=1}^{N_e}$, where $S_e^k$ is an output vector from individual deciders; $s_e^k=wrsr_e^k+wvsv_e^k$, wr and wv respectively denote weights for real and virtual ends, $sr_e^k$ and $sv_e^k$ respectively denote a class number or a probability of belonging to a certain class for the real and virtual ends of the individual decider, k=1, ..., $N_e$, $N_e$ denotes a number of samples in the decider training dataset, $S_e^k=(s_{1e}^k, ..., s_{De}^k)$, $s_{ie}^k$ denotes an output from the ith parallel multi-layer decomposed interval type-2 intuitionistic fuzzy convolutional neural network, i= 1, ..., D, and $Es_e^k$ denotes an output label;
   4.2) training, by the established decider training dataset, an intuitionistic fuzzy decider based on hybrid parameter optimization:

$$Ys_e^k = \alpha \sum_{j=1}^{M} w_j \mathbb{T}_{i=1}^{D} \mu_{ij}(s_{ie}^k) / \sum_{j=1}^{M} \mathbb{T}_{i=1}^{D} \mu_{ij}(s_{ie}^k) + \quad (20)$$
   $$(1-\alpha) \sum_{j=1}^{M} v_j \mathbb{S}_{i=1}^{D} v_{ij}(s_{ie}^k) / \sum_{j=1}^{M} \mathbb{S}_{i=1}^{D} v_{ij}(s_{ie}^k)$$

where $\alpha \in (0,1)$, $Ys_e^k$ denotes a final output from the decider, and $s_{ie}^k$ denotes an output from the ith parallel multi-layer decomposed interval type-2 intuitionistic fuzzy convolutional neural network, i=1, ..., D; $w_j$ and $v_j$ denote intuitionistic fuzzy rule consequents; $\mathbb{T}$ and $\mathbb{S}$ denote a triangular norm and triangular conorm; j=1, 2, ..., M, M denotes the number of fuzzy rules; $\mathbb{T}_{i=1}^{D}$ and $\mathbb{S}_{i=1}^{D}$ denote $\mathbb{T}$ and $\mathbb{S}$ operations from 1 to D;
   adjusting the precondition parameters of the intuitionistic fuzzy decider by a batch gradient descent method, and estimating the consequent parameters of the intuitionistic fuzzy decider by a least square method, the whole process comprising:
   4.2.1) randomly initializing a center $c_{ij}$, a width $\sigma_{ij}$ and a scale coefficient $r_{ij}$ for the precondition membership function and non-membership function of the intuitionistic fuzzy decider, and adjusting the precondition parameters by the batch gradient descent method:

$$\nabla E(c_{ij},\sigma_{ij},r_{ij},\alpha)=(\partial E/\partial c_{ij},\partial E/\partial \sigma_{ij},\partial E/\partial r_{ij},\partial E/\partial \alpha) \quad (21)$$

where $\nabla E(c_{ij}, \sigma_{ij}, r_{ij}, \alpha)$ denotes a gradient vector, $E=\frac{1}{2}\sum_{k=1}^{N_b}(Ys_e^k-Es_e^k)^2$, which is a loss function, and $N_b$ denotes the number of data in each batch;
   4.2.2) calculating a firing strength for a fuzzy rule membership function and a fuzzy rule non-membership function by using the precondition parameters adjusted in the S4.2.1, i.e., $f_j(S_e^k)$ and $g_j(S_e^k)$, and normalizing to obtain $f'_j(S_e^k)=f_j(S_e^k)/\sum_{j=1}^{M}f_j(S_e^k)$ and $g'_j(S_e^k)=g_j(S_e^k)/\sum_{j=1}^{M}g_j(S_e^k)$; for a batch of data, obtaining matrices F' and G':

$$F' = \begin{bmatrix} f'_1(S_e^1) & \cdots & f'_M(S_e^1) \\ \vdots & \ddots & \vdots \\ f'_1(S_e^{N_b}) & \cdots & f'_M(S_e^{N_b}) \end{bmatrix}, \quad (22)$$

$$G' = \begin{bmatrix} g'_1(S_e^1) & \cdots & g'_M(S_e^1) \\ \vdots & \ddots & \vdots \\ g'_1(S_e^{N_b}) & \cdots & g'_M(S_e^{N_b}) \end{bmatrix}$$

according to Formula (22), obtaining a matrix synthesized by F' and G': $\Phi=[\alpha F'|(1-\alpha)G']$; for some consequent parameters of the fuzzy rule membership function $W=[w_1 \ldots w_M]^T$ and the other consequent parameters of the fuzzy rule non-membership function $V=[v_1 \ldots v_M]^T$, obtaining a parameter vector $\Theta=[W^T V^T]^T$, where $\Phi\Theta=ES_e$ according to Formula (20) because $\Phi$ is a $N_b \times 2M$ matrix and $ES_e$ is a $N_b \times 1$ output label vector, and obtaining a consequent parameter vector $\Theta=\Phi^+ES_e$ by generalized inverse.

\* \* \* \* \*